US011861800B2

(12) United States Patent
Anvaripour et al.

(10) Patent No.: US 11,861,800 B2
(45) Date of Patent: Jan. 2, 2024

(54) PRESENTING AVAILABLE AUGMENTED REALITY CONTENT ITEMS IN ASSOCIATION WITH MULTI-VIDEO CLIP CAPTURE

(71) Applicant: Snap Inc., Santa Monica, CA (US)

(72) Inventors: Kaveh Anvaripour, Santa Monica, CA (US); Christine Barron, Los Angeles, CA (US); Amar Boghani, Los Angeles, CA (US); Ranidu Lankage, Belmont, CA (US); Gabriel Lupin, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/557,327

(22) Filed: Dec. 21, 2021

(65) Prior Publication Data
US 2022/0207838 A1 Jun. 30, 2022

Related U.S. Application Data

(60) Provisional application No. 63/132,294, filed on Dec. 30, 2020.

(51) Int. Cl.
*G06T 19/00* (2011.01)
*H04L 51/52* (2022.01)
(Continued)

(52) U.S. Cl.
CPC .......... *G06T 19/006* (2013.01); *H04L 51/222* (2022.05); *H04L 51/52* (2022.05); *H04N 23/631* (2023.01)

(58) Field of Classification Search
CPC ....... G06T 19/006; H04L 51/10; H04L 51/52; H04N 23/631; G06F 3/0482; G06F 3/04847; G06F 3/0488
See application file for complete search history.

(56) References Cited

U.S. PATENT DOCUMENTS 9,361,521 B1  6/2016  Mclean et al.
9,807,337 B2  10/2017  Miner
(Continued)

FOREIGN PATENT DOCUMENTS

CN    110710192 A  *  1/2020
CN    115516445 A  *  12/2022
(Continued)

OTHER PUBLICATIONS

"International Application Serial No. PCT/US2021/064704, International Search Report dated Apr. 7, 2022", 4 pgs.
(Continued)

*Primary Examiner* — Chante E Harrison
(74) *Attorney, Agent, or Firm* — Schwegman Lundberg & Woessner, P.A.

(57) ABSTRACT

Aspects of the present disclosure involve a system comprising a computer-readable storage medium storing a program and method for presenting available augmented reality (AR) content items. The program and method provide for displaying a capture interface in accordance with a camera mode configured to capture multiple video clips; displaying a carousel interface for presenting a first set of AR content items, each being selectable to apply respective AR content to captured video; receiving first user input selecting an explore tab included which is selectable to switch to an explorer interface for presenting a second set of AR content items; switching from the capture interface to the explorer interface; receiving, via the explorer interface, second user input selecting an AR content item from among the second set; and updating, in response to receiving the second user input, the first set of AR content items to include the selected AR content item.

19 Claims, 13 Drawing Sheets

(51) Int. Cl.
    *H04L 51/222*     (2022.01)
    *H04N 23/63*     (2023.01)

(56) References Cited

U.S. PATENT DOCUMENTS

| | | | |
|---|---|---|---|
| 10,289,287 B2 | 5/2019 | Rathod | |
| 10,498,950 B2 | 12/2019 | Ueno | |
| 10,645,335 B2 | 5/2020 | Abe | |
| 11,146,847 B1* | 10/2021 | Harshawat | G06F 3/0481 |
| 2007/0174774 A1 | 7/2007 | Lerman et al. | |
| 2009/0288010 A1 | 11/2009 | Ubillos | |
| 2011/0170008 A1 | 7/2011 | Koch | |
| 2012/0308209 A1 | 12/2012 | Zaletel | |
| 2013/0145269 A1 | 6/2013 | Latulipe et al. | |
| 2014/0029915 A1 | 1/2014 | Lin | |
| 2014/0055633 A1 | 2/2014 | Marlin et al. | |
| 2016/0080686 A1 | 3/2016 | Oyama et al. | |
| 2016/0216871 A1 | 7/2016 | Stamatiou | |
| 2016/0225410 A1 | 8/2016 | Lee et al. | |
| 2017/0109585 A1 | 4/2017 | Matias et al. | |
| 2017/0213297 A1 | 7/2017 | Havilio | |
| 2017/0316792 A1 | 11/2017 | Chaudhuri et al. | |
| 2017/0358321 A1 | 12/2017 | Kilar et al. | |
| 2018/0082430 A1 | 3/2018 | Sharma et al. | |
| 2018/0091728 A1 | 3/2018 | Brown et al. | |
| 2018/0131878 A1 | 5/2018 | Charlton et al. | |
| 2019/0166400 A1 | 5/2019 | Andreou et al. | |
| 2019/0342507 A1 | 11/2019 | Dye et al. | |
| 2020/0034033 A1 | 1/2020 | Chaudhri et al. | |
| 2020/0186728 A1 | 6/2020 | Pena et al. | |
| 2020/0351353 A1 | 11/2020 | Al Majid et al. | |
| 2020/0356593 A1 | 11/2020 | Azzinnari et al. | |
| 2020/0358963 A1 | 11/2020 | Manzari et al. | |
| 2022/0005477 A1 | 1/2022 | Ma et al. | |
| 2022/0206738 A1 | 6/2022 | Anvaripour et al. | |
| 2022/0207805 A1* | 6/2022 | Anvaripour | G06F 16/24573 |
| 2022/0210328 A1 | 6/2022 | Anvaripour et al. | |
| 2022/0210337 A1 | 6/2022 | Anvaripour et al. | |

FOREIGN PATENT DOCUMENTS

| | | |
|---|---|---|
| CN | 116648895 A | 8/2023 |
| CN | 116671121 A | 8/2023 |
| CN | 116685995 A | 9/2023 |
| CN | 116710881 A | 9/2023 |
| WO | WO-2014031899 A1 * | 2/2014 |
| WO | 2020047117 | 3/2020 |
| WO | 2020186969 | 9/2020 |
| WO | WO-2021173147 A1 * | 9/2021 |
| WO | WO-2022090841 A1 * | 5/2022 |
| WO | 2022146795 | 7/2022 |
| WO | 2022146796 | 7/2022 |
| WO | 2022146798 | 7/2022 |
| WO | 2022146849 | 7/2022 |
| WO | 2022146851 | 7/2022 |

OTHER PUBLICATIONS

"International Application Serial No. PCT/US2021/064704, Written Opinion dated Apr. 7, 2022", 7 pgs.
"International Application Serial No. PCT/US2021/064985, International Search Report dated Apr. 7, 2022", 4 pgs.
"International Application Serial No. PCT/US2021/064985, Written Opinion dated Apr. 7, 2022", 7 pgs.
Ward, Bejamin, "Snapchat New Timeline Feature", [Online] Retrieved from the Internet: <URL: https://www.youtube.com/watch?v=uLUM2rWAYE4>, [retrieved on Mar. 29, 2022], (Nov. 21, 2020), 2 pgs.
Jacinta, "A Guide to Instagram Reels—feedalpha : Social Media Automation A Guide to Instagram Reels", [Online] Retrieved from the Internet: <URL: https://feedalpha.com/a-guide-to-instagram-reels/>, [retrieved on Mar. 2022], (Oct. 20, 2020), 12 pgs.
Nacis, Johnny, "Snapchat : How To use Timeline 2020", [Online] Retrieved from the Internet: <URL:https://www.youtube.com/watch?v=vpd_fhM_OTg>, [retrieved on Mar. 25, 2022], (Sep. 13, 2020), 2 pgs.
Stickly, Katie, "How to trim a TikTok video After recording—YouTube", [Online] Retrieved from the Internet: <URL: https://www.youtube.com/watch?v=sQzVtCsa6hU>, [retrieved on Mar. 29, 2022], (Feb. 7, 2020), 2 pgs.
Peterson, Jake, "How to Add 2020's Most Popular Songs to Your Snaps and Stories in Snapchat", [Online] Retrieved from the Internet: <URL: https://ios.gadgethacks.com/how-to/add-2020s-most-popular-songs-your-snaps-stories-snapchat-0344491/>, [retrieved on Mar. 26, 2022], (Oct. 15, 2020), 8 pgs.
Wynne, Mabel, "How to edit a video on TikTok", [Online] Retrieved from the Internet: <URL: https://www.creativeblog.com/how-to/edit-video-on-tiktok>, [retrieved on Mar. 27, 2022], (Nov. 4, 2020), 8 pgs.
"International Application Serial No. PCT/US2021/064682, International Search Report dated Apr. 14, 2022", 4 pgs.
"International Application Serial No. PCT/US2021/064682, Written Opinion dated Apr. 14, 2022", 6 pgs.
"International Application Serial No. PCT/US2021/064990, International Search Report dated Apr. 21, 2022", 4 pgs.
"International Application Serial No. PCT/US2021/064990, Written Opinion dated Apr. 21, 2022", 7 pgs.
"International Application Serial No. PCT/US2021/064697, International Search Report dated Apr. 11, 2022", 5 pgs.
"International Application Serial No. PCT/US2021/064697, Written Opinion dated Apr. 11, 2022", 8 pgs.
"U.S. Appl. No. 17/556,603, Non Final Office Action dated Feb. 14, 2023", 18 pgs.
"U.S. Appl. No. 17/556,713, Non Final Office Action dated Mar. 30, 2023", 10 pgs.
"U.S. Appl. No. 17/556,603, Response filed May 15, 23 to Non Final Office Action dated Feb. 14, 2023", 9 pgs.
"U.S. Appl. No. 17/556,603, Final Office Action dated Jun. 12, 2023", 26 pgs.
"U.S. Appl. No. 17/556,713, Response filed Jun. 22, 2023 to Non Final Office Action dated Mar. 30, 2023", 9 pgs.
"U.S. Appl. No. 17/557,305, Non Final Office Action dated Jun. 26, 2023", 16 pgs.
Stone, Marcus, "VLLO—How to ADD text", Youtube, [Online] Retrieved from the Internet: <URL: https://www.youtube.com/watch?v=B0rGe6EFdWQ>, (Feb. 2, 2020), 7 pgs.
"U.S. Appl. No. 17/556,603, Non Final Office Action dated Sep. 22, 2023", 32 pgs.
"U.S. Appl. No. 17/556,603, Response filed Sep. 11, 2023 to Final Office Action dated Jun. 12, 2023", 10 pgs.
"U.S. Appl. No. 17/556,713, Final Office Action dated Sep. 26, 2023", 11 pgs.
"U.S. Appl. No. 17/556,802, Non Final Office Action dated Oct. 2, 2023", 11 pgs.
"U.S. Appl. No. 17/557,305, Notice of Allowance dated Oct. 2, 2023", 10 pgs.
"U.S. Appl. No. 17/557,305, Response filed Sep. 18, 2023 to Non Final Office Action dated Jun. 26, 2023", 10 pgs.
Boykin, Brendan, "iMovie for iPhone and iPad", O'Reilly Media, Inc., (May 2012), 79 pgs.

* cited by examiner

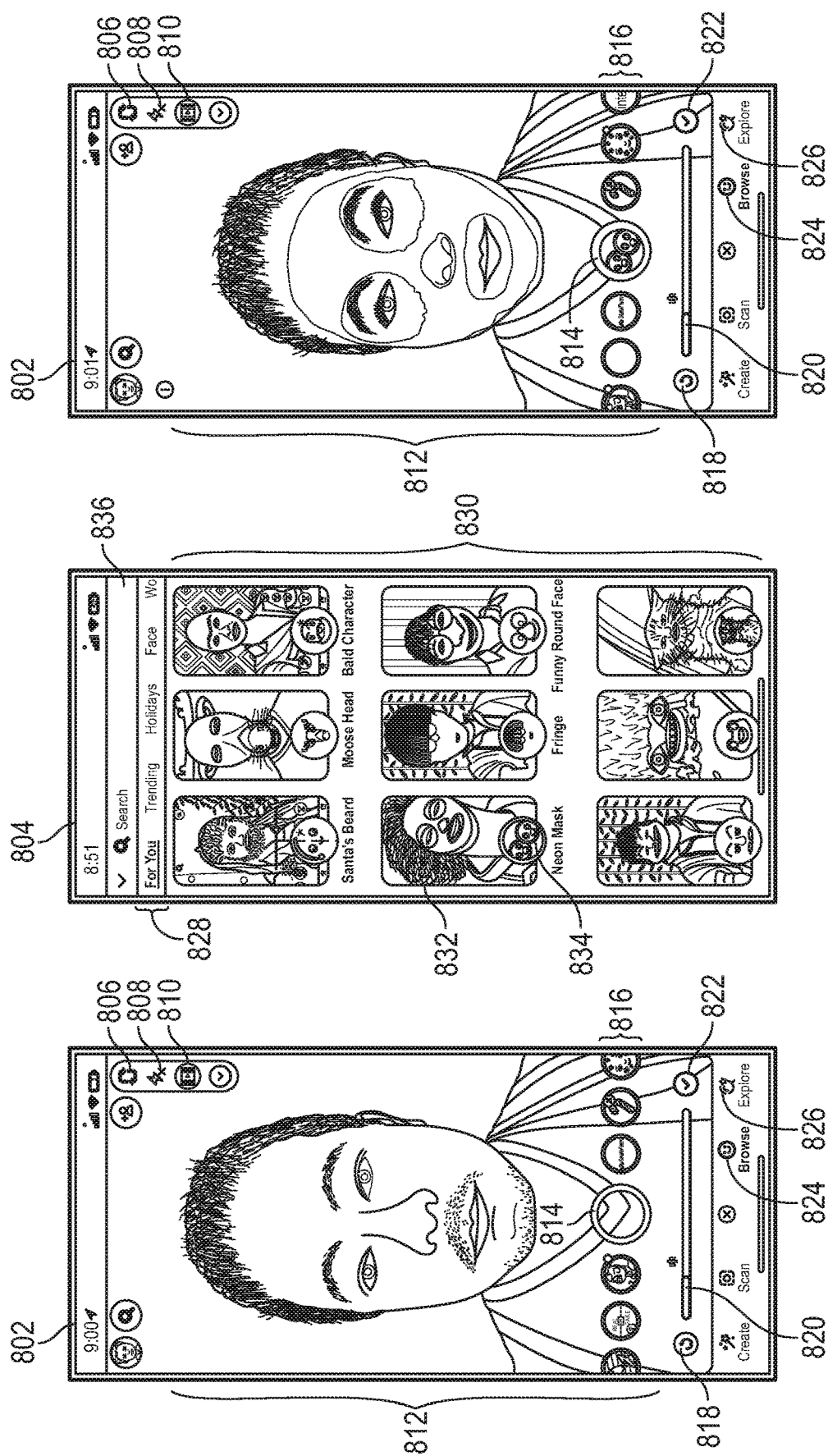

PRESENTING AVAILABLE AUGMENTED REALITY CONTENT ITEMS IN ASSOCIATION WITH MULTI-VIDEO CLIP CAPTURE

CROSS-REFERENCE TO RELATED APPLICATION

This patent application claims the benefit of U.S. Provisional Patent Application No. 63/132,294, filed Dec. 30, 2020, entitled "PRESENTING AVAILABLE AUGMENTED REALITY CONTENT ITEMS IN ASSOCIATION WITH MULTI-VIDEO CLIP CAPTURE", which is incorporated by reference herein in its entirety.

TECHNICAL FIELD

The present disclosure relates generally to a messaging system, including presenting available augmented reality content items (e.g., Lenses) in association with multi-video clip capture within a messaging system.

BACKGROUND

Messaging systems provide for the exchange of message content between users. For example, a messaging system allows a user to exchange message content (e.g., text, images) with one or more other users.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which:

FIGS. 8A-8C illustrate switching between a carousel interface and explorer interface for selecting augmented reality content items in association with multi-video clip capture, in accordance with some example embodiments.

DETAILED DESCRIPTION

A messaging system typically allow users to exchange content items (e.g., messages, images and/or video) with one another in a message thread. A messaging system may implement one or more content feeds for surfacing media content to end users.

The disclosed embodiments provide for a messaging system to include different user interfaces for presenting available augmented reality content items (e.g., Lenses) in association with a multi-video clip camera mode. The camera mode corresponds with capturing multiple video clips which are combinable to generate a media content item (e.g., for sending to a friend, broadcasting to others, etc.).

The user interfaces for presenting available augmented reality content items include a carousel interface and an explorer user interface. The carousel interface presents a first set of available augmented reality content items while the device is capturing video in the multi-video clip camera mode. The explorer user interface is a separate interface with a tile view for presenting a second set of available augmented reality content items. In a case where the user selects an augmented reality content item via the explorer user interface, the messaging system stores an indication of the selected augmented reality content item. The stored indication is usable to persistently present the selected augmented reality content item within the carousel interface, for example, until the session for multi-video clip capture is complete. Indications for position within the tiled view and text-based searching via the explorer user interface may also be stored for persistence between user interfaces, until the session is complete.

Figure 1:
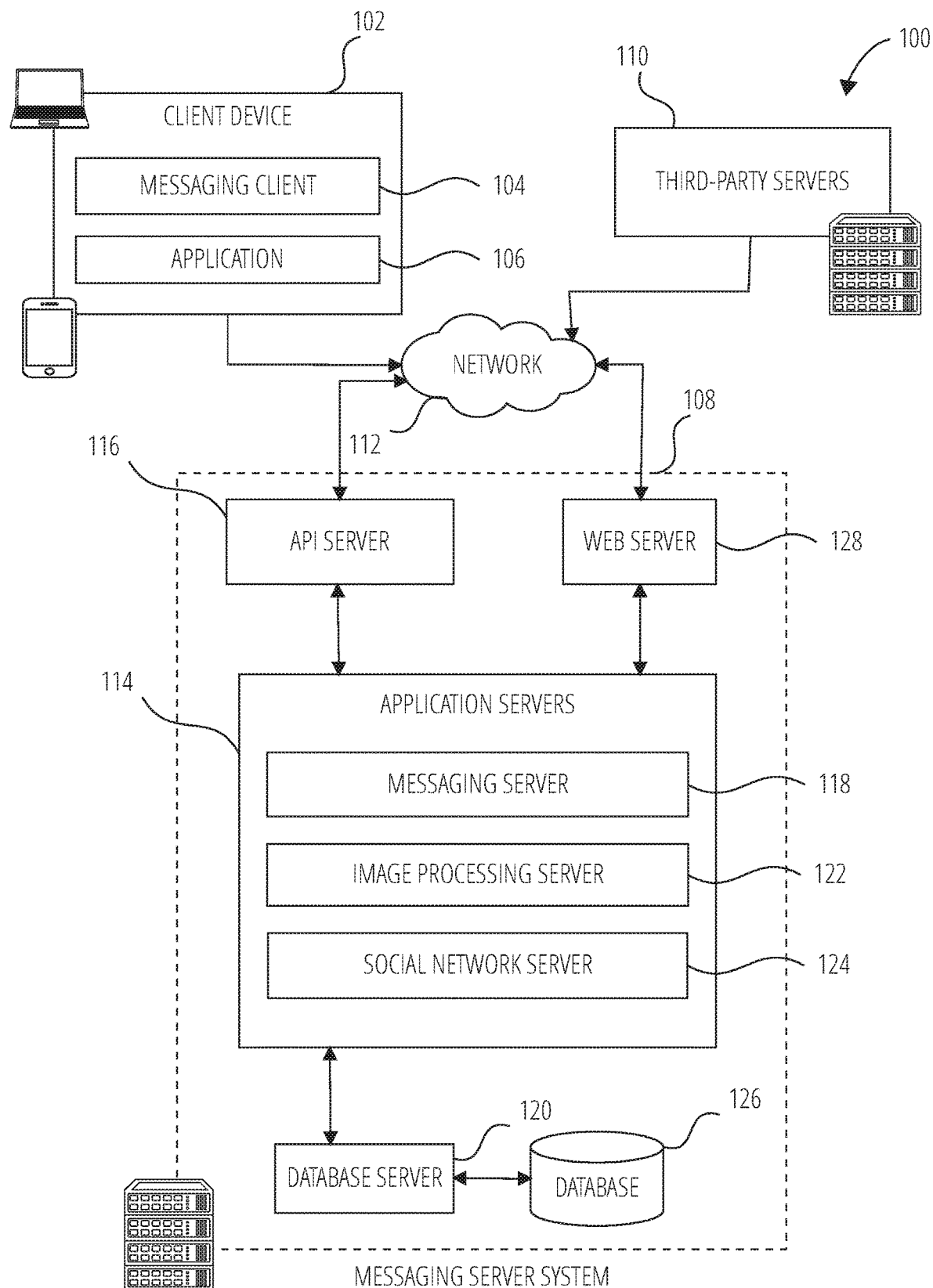
FIG. 1 is a diagrammatic representation of a networked environment in which the present disclosure may be deployed, in accordance with some examples.

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other applications 106. Each messaging client 104 is communicatively coupled to other instances of the messaging client 104 (e.g., hosted on respective other client devices 102), a messaging server system 108 and third-party servers 110 via a network 112 (e.g., the Internet) A messaging client 104 can also communicate with locally-hosted applications 106 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 3:
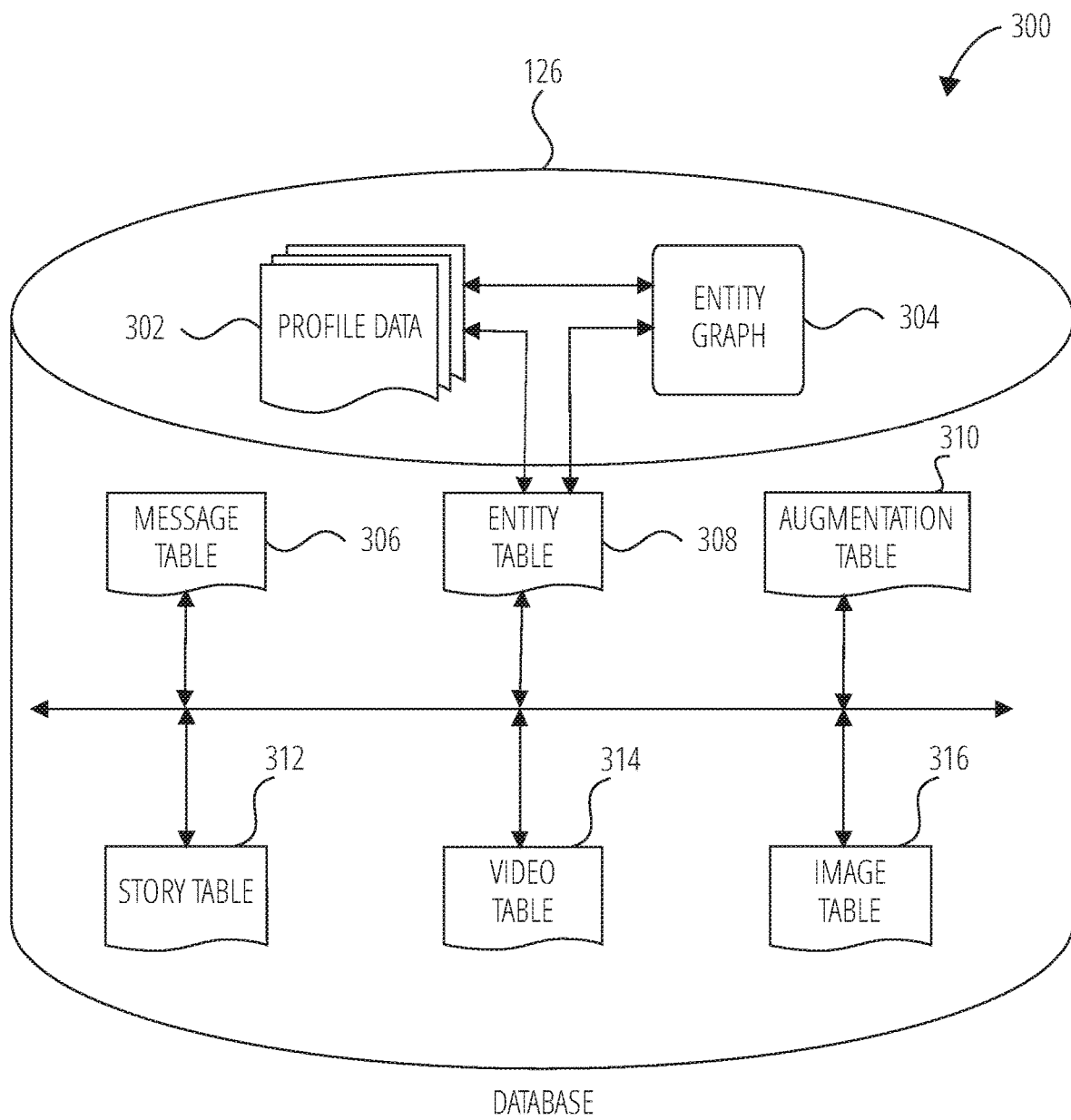
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 304 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., an application 106 or apples) are made available to a user via an interface of the messaging client 104. In this context, "external" refers to the fact that the application 106 or applet is external to the messaging client 104. The external resource is often provided by a third party but may also be provided by the creator or provider of the messaging client 104. The messaging client 104 receives a user selection of an option to launch or access features of such an external resource. The external resource may be the application 106 installed on the client device 102 (e.g., a "native app"), or a small-scale version of the application (e.g., an "applet") that is hosted on the client device 102 or remote of the client device 102 (e.g., on third-party servers 110). The small-scale version of the application includes a subset of features and functions of the application (e.g., the full-scale, native version of the application) and is implemented using a markup-language document. In one example, the small-scale version of the application (e.g., an "applet") is a web-based, markup-language version of the application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the messaging client 104 determines whether the selected external resource is a web-based external resource or a locally-installed application 106. In some cases, applications 106 that are locally installed on the client device 102 can be launched independently of and separately from the messaging client 104, such as by selecting an icon, corresponding to the application 106, on a home screen of the client device 102. Small-scale versions of such applications can be launched or accessed via the messaging client 104 and, in some examples, no or limited portions of the small-scale application can be accessed outside of the messaging client 104. The small-scale application can be launched by the messaging client 104 receiving, from a third-party server 110 for example, a markup-language document associated with the small-scale application and processing such a document.

In response to determining that the external resource is a locally-installed application 106, the messaging client 104 instructs the client device 102 to launch the external resource by executing locally-stored code corresponding to the external resource. In response to determining that the external resource is a web-based resource, the messaging client 104 communicates with the third-party servers 110 (for example) to obtain a markup-language document corresponding to the selected external resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

Figure 2:
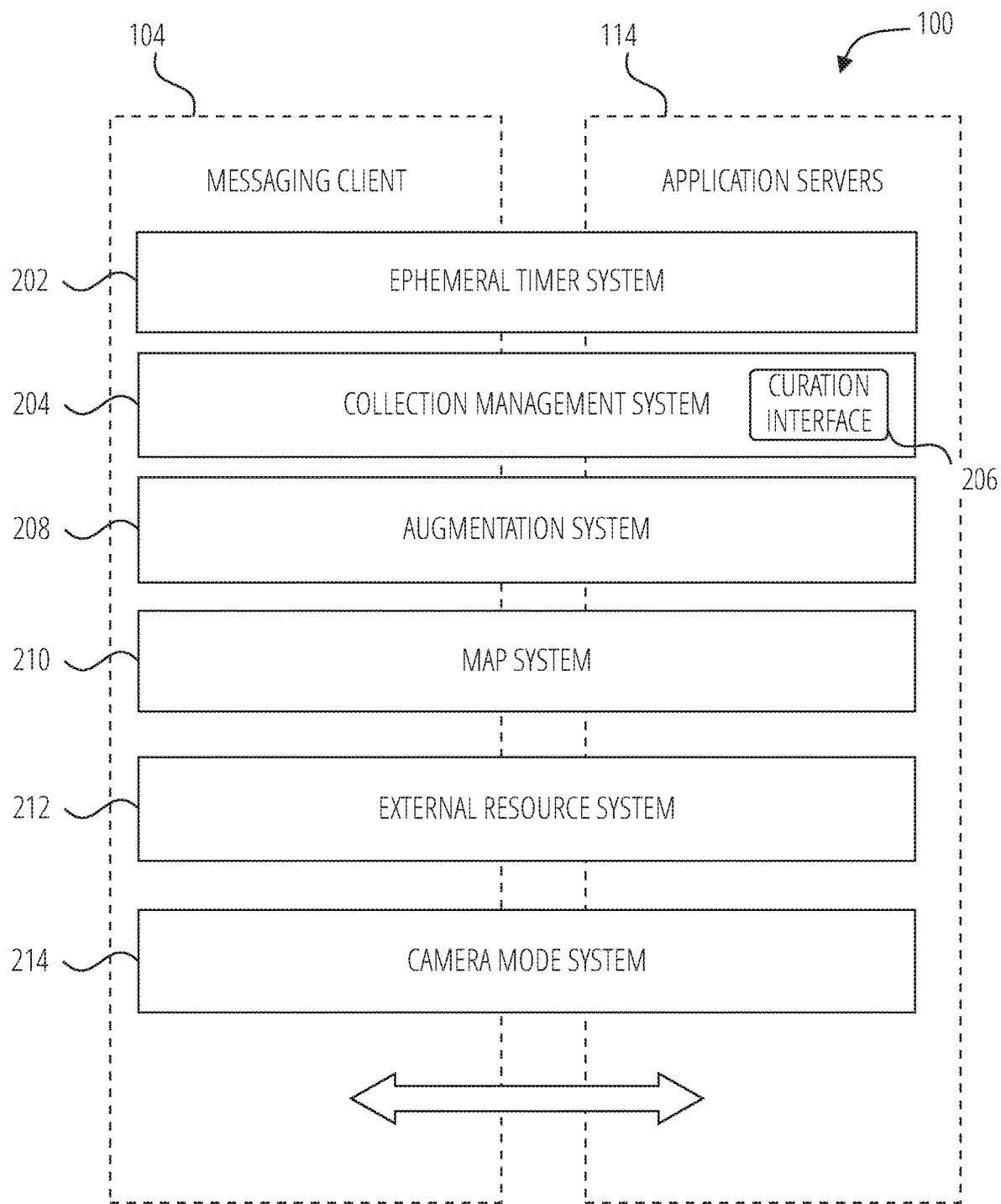
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client-side by the messaging client 104 and on the sever-side by the application servers 114. These subsystems include, for example, an ephemeral timer system 202, a collection management system 204, an augmentation system 208, a map system 210, an external resource system 212, and a camera mode system 214.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time.

In other examples, as discussed below with respect to FIG. 3, the augmentation system 208 provides for presenting augmented reality content in association with an image or a video captured by a camera of the client device 102. The augmentation system 208 may implement or otherwise access augmented reality content items (e.g., corresponding to applying Lenses or augmented reality experiences) for providing real-time special effect(s) and/or sound(s) that may be added to the image or video. To facilitate the presentation of augmented reality content, the augmentation system 208 may implement or otherwise access object recognition algorithms (e.g., including machine learning algorithms) configured to scan an image or video, and to detect/track the movement of objects within the image or video.

The map system 210 provides various geographic location functions, and supports the presentation of map-based media content and messages by the messaging client 104. For example, the map system 210 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The external resource system 212 provides an interface for the messaging client 104 to communicate with remote servers (e.g. third-party servers 110) to launch or access external resources, i.e. applications or applets. Each third-party server 110 hosts, for example, a markup language (e.g., HTML5) based application or small-scale version of an application (e.g., game, utility, payment, or ride-sharing application). The messaging client 104 may launches a web-based resource (e.g., application) by accessing the HTML5 file from the third-party servers 110 associated with the web-based resource. In certain examples, applications hosted by third-party servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given external resource access to certain user data of the messaging client 104. HTML5 is used as an example technology for programming games, but applications and resources programmed based on other technologies can be used.

In order to integrate the functions of the SDK into the web-based resource, the SDK is downloaded by a third-party server 110 from the messaging server 118 or is otherwise received by the third-party server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., applications 106 or applets and the messaging client 104. This provides the user with a seamless experience of communicating with other users on the messaging client 104, while also preserving the look and feel of the messaging client 104. To bridge communications between an external resource and a messaging client 104, in certain examples, the SDK facilitates communication between third-party servers 110 and the messaging client 104. In certain examples, a Web ViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with third-party servers 110. The SDK limits which information is shared based on the needs of the external resource. In certain examples, each third-party server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale applications (e.g., an application 106) are provided with access to a first type of user data (e.g., only two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The camera mode system 214 implements various functions for providing different camera modes within the context of the messaging system 100. For example, the camera mode system 214 provides for first and second camera modes, and for providing the user with the option to select between the first and second camera modes. The first camera mode corresponds with capturing a single video clip in order to generate a media content item. The camera mode system 214 provides a second camera mode for capturing multiple videos for combining to generate the media content item. In addition, the camera mode system 214 is configured to adjust user interfaces (e.g., a capture user interface for capturing video clip(s) and/or a preview user interface for previewing captured video clip(s)) based on which camera mode is enabled.

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 306. This message data includes, for any particular one message, at least message sender data, message recipient (or receiver) data, and a payload. Further details regarding information that may be included in a message, and included within the message data stored in the message table 306 is described below with reference to FIG. 4.

An entity table 308 stores entity data, and is linked (e.g., referentially) to an entity graph 304 and profile data 302. Entities for which records are maintained within the entity table 308 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 304 stores information regarding relationships and associations between entities. Such relationships may be social, professional (e.g., work at a common corporation or organization) interested-based or activity-based, merely for example.

The profile data 302 stores multiple types of profile data about a particular entity. The profile data 302 may be selectively used and presented to other users of the messaging system 100, based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 314) and images (for which data is stored in an image table 316).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying Lenses or augmented reality experiences). An augmented reality content item may provide a real-time special effect and/or sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in one example, is associated with messages for which records are maintained within the message table 306. Similarly, the image table 316 stores image data associated with messages for which message data is stored in the entity table 308. The entity table 308 may associate various augmentations from the augmentation table 310 with various images and videos stored in the image table 316 and the video table 314.

Figure 4:
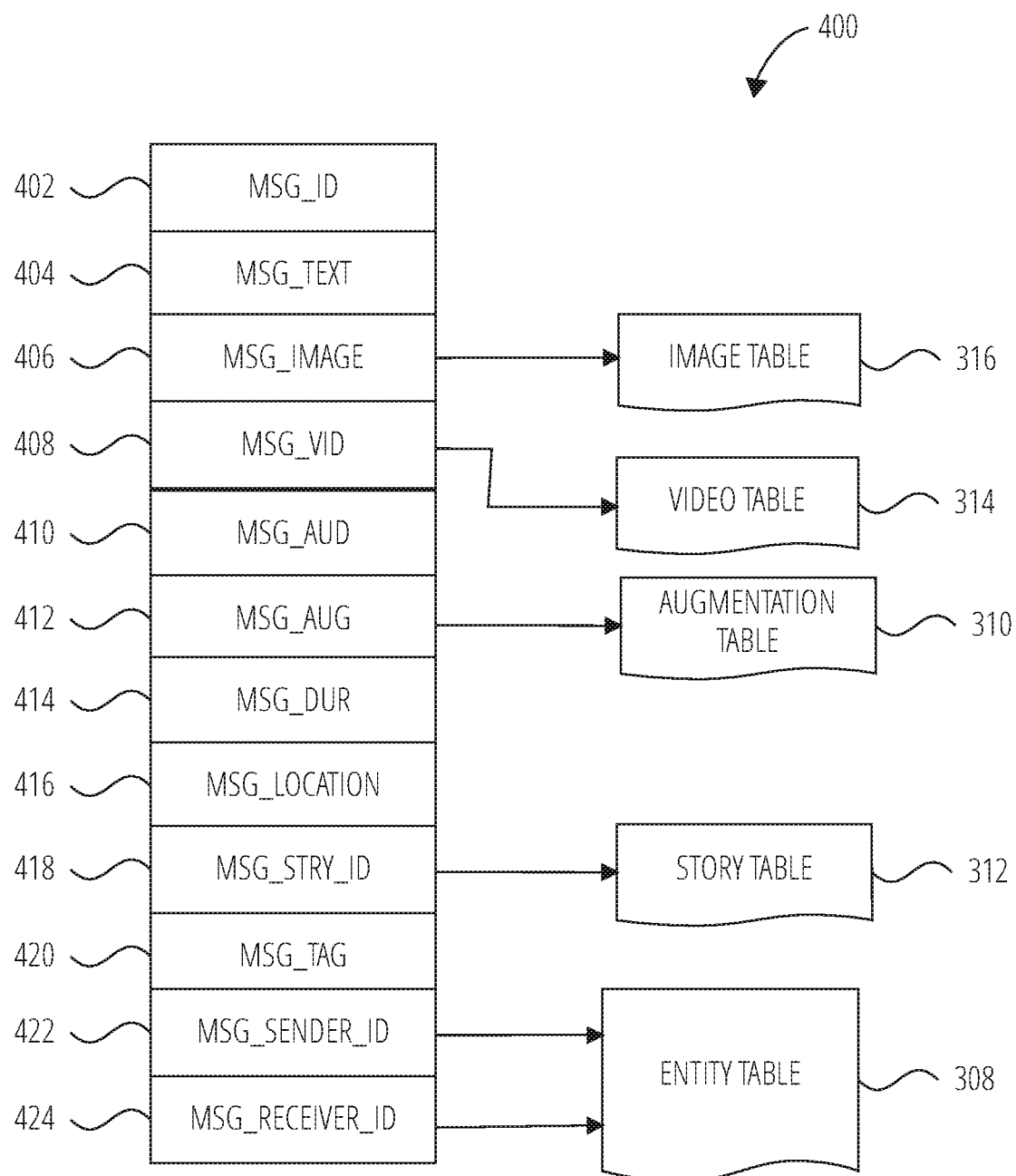
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 306 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 316.
- message video payload 408: video data, captured by a camera component or retrieved from a memory component of the client device 102, and that is included in the message 400. Video data for a sent or received message 400 may be stored in the video table 314.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

message story identifier 418: identifier values identifying one or more content collections (e.g., "stories" identified in the story table 312) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the Client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentations 412 may point to data stored in an augmentation table 310, values stored within the message story identifier 418 may point to data stored in a story table 312, and values stored within the message sender identifier 422 and the message receiver identifier 424 may point to user records stored within an entity table 308.

Figure 5:
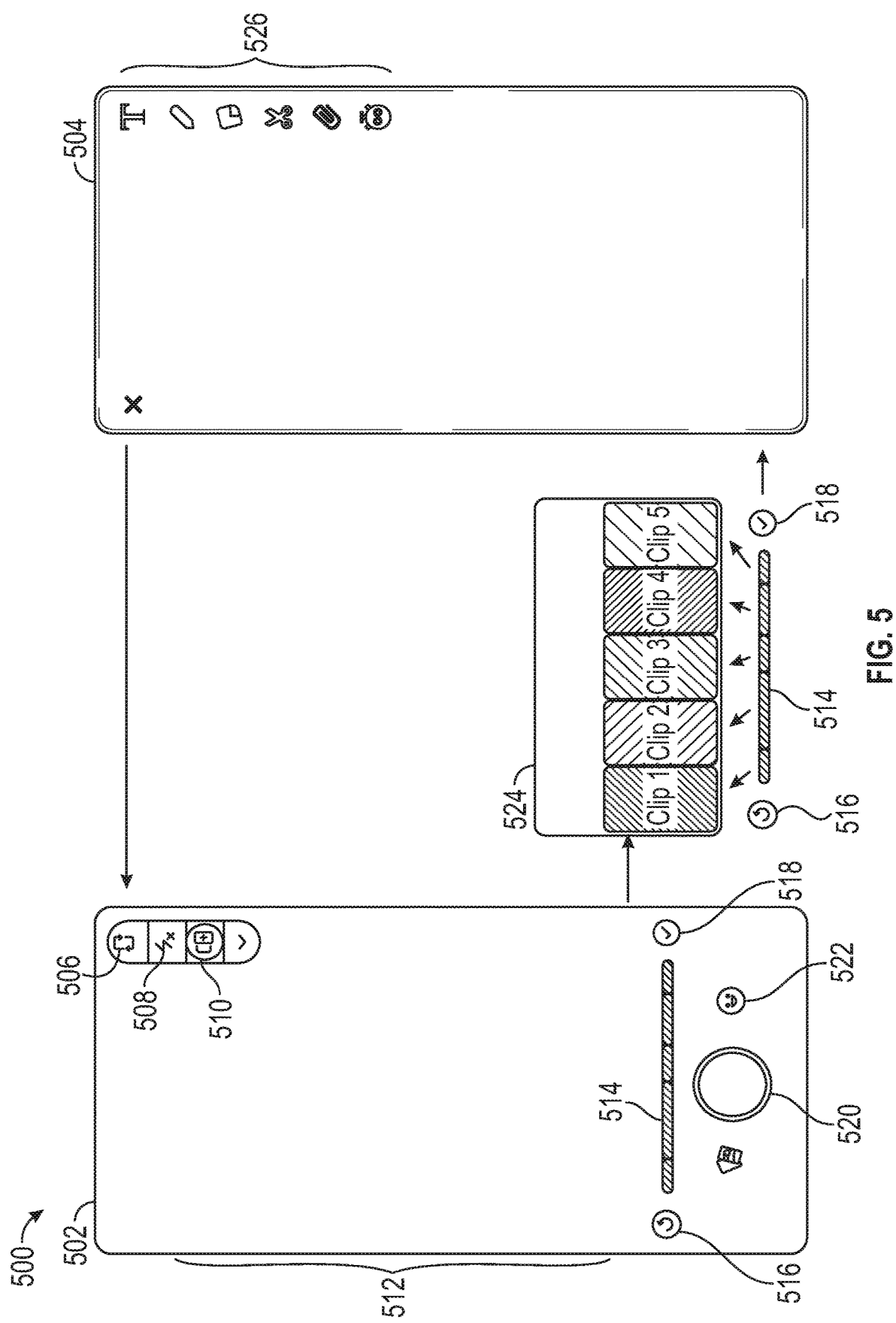
FIG. 5 is a diagram illustrating a user interface arrangement configured to capture, combine and preview multiple video clips, in accordance with some example embodiments.

FIG. 5 is a diagram illustrating a user interface arrangement 500 configured to capture, combine and preview multiple video clips, in accordance with some example embodiments. For explanatory purposes, the user interface arrangement 500 is primarily described herein with reference to the messaging client 104 of FIG. 1, and the camera mode system 214 of FIG. 2. Not all of the depicted and described interfaces/components may be used in all implementations, and one or more embodiments may include additional or different interfaces/components than those shown and described with respect to the figure. Variations in the arrangement and type of the interfaces/components may be made without departing from the spirit or scope of the claims as set forth herein.

The user interface arrangement 500 may be implemented at least in part by the camera mode system 214. As noted above, the camera mode system 214 may correspond to a subsystem of the messaging system 100, and may be supported on the client side by the messaging client 104 and/or on the server side by the application servers 114. In one or more embodiments, the capturing, combining and previewing of video clip(s) as described herein may be implemented client side, server side and/or a combination of client side and server side.

As shown in FIG. 5, the capture user interface 502 includes a camera selection button 506, which is user-selectable for switching between the rear-facing and front-facing camera of the client device 102. The capture user interface 502 further includes a flash button 508 for activating or deactivating a flash with respect to captured image data 512 (or a captured image). The capture user interface 502 further includes a camera mode selection button 510. In addition, the capture user interface 502 includes a carousel launch button 522 for launching a carousel interface, as discussed below with respect to FIG. 6D.

Moreover, the capture user interface 502 includes a capture button 520 which is user-selectable to capture video (e.g., video clips) and/or images (e.g., pictures). As described herein, a "video clip" corresponds to a series of video frames that runs for an uninterrupted period of time. For example, a video clip corresponds with the video captured from moment that the camera of starts recording until the moment the camera stops recording.

In one or more embodiments, the messaging client 104 in conjunction with the camera mode system 214 provides for a user to select between a first camera mode and a second camera mode for video capture. For example, the first camera mode corresponds with capturing a single video clip which is usable to generate a media content item. The second camera mode corresponds with capturing multiple video clips which may be combined to generate the media content item.

In this regard, the camera mode selection button 510 is user-selectable for switching between the first camera mode and the second camera mode. In one or more embodiments, the messaging client 104 defaults to the first camera mode. For example, upon startup of the messaging client 104, the messaging client 104 activates the camera of the client device 102 to display captured image data 512 in real time, and to default to the first camera mode with respect to the capture user interface 502.

In response to user selection of the camera mode selection button 510, the messaging client 104 in conjunction with the camera mode system 214 provides for switching from the first camera mode to the second camera mode. Switching to the second camera mode may also be effected via a predefined touch gesture (e.g., a left drag gesture starting from the capture button 520 while in the first camera mode). In one or more embodiments, a tutorial (e.g., a modal or overlay) may be presented the first time the second camera mode is launched, to teach the user of features related to the second camera mode.

In the first camera mode, the capture button 520 is selectable to capture a single video clip via a predefined gesture (e.g., a press-and-hold gesture, where video is recorded for the duration of the hold). In addition, the capture button 520 is selectable to capture a picture via another predefined gesture (e.g., tap gesture).

In the second camera mode, the behavior of the capture button 520 may differ from that of the first camera mode in order to facilitate capturing multiple video clips. In one or more embodiments, the capture button 520 is responsive to different types of touch input for capturing video clips. In a first example, the capture button 520 is selectable to capture a video clip via a press-and-hold gesture (e.g., where video is recorded for the duration of the hold). In another example, the capture button 520 is selectable to capture a video clip via first and second tap gestures, with the first tap gesture initiating video capture and the second tap gesture ending video capture for the video clip (e.g., corresponding to hands-free recording).

In one or more embodiments, a predefined touch region for the capture button 520 for the second tap gesture may smaller than for the first tap gesture (e.g., to reduce likelihood of the user inadvertently stopping video capture). For example, the touch region may correspond to a predefined region within the center of the displayed capture button 520.

In the second camera mode, the camera mode system 214 provides for capturing the multiple video clips in a sequential manner, such that the first video clip is followed by the second video clip, the second video clip is followed by the third video clip, and so on. Each of the video clips may have been captured in response to respective touch inputs via the capture button 520 (e.g., press-and-hold gestures, first/second taps, or combinations thereof).

In one or more embodiments, the camera mode system 214 provides for displaying updates to the timeline progress bar 514 in real-time, to depict video clips as they are captured. As shown in the example of FIG. 5, display of the timeline progress bar 514 may be accompanied by display of the undo button 516 and the preview button 518. In one or more embodiments, the camera mode system 214 provides for displaying the undo button 516, the timeline progress bar 514 and the preview button 518 in the second camera mode only. As such, the undo button 516, the timeline progress bar 514 and the preview button 518 are not displayed while the first camera mode is active.

As shown in the example of FIG. 5, the timeline progress bar 514 depicts video clips as respective segments, with the length of each segment being proportional to the duration of the respective video clip. The segments may be added and/or updated in real-time. The length of each segment may appear to increase in real-time as each respective video clip is being captured. For illustrative purposes, the expanded view 524 (which is not necessarily shown by the capture user interface 502) depicts example video clips 15.

In one or more embodiments, the timeline progress bar 514 is configured to update in real-time based on passing preset time thresholds with respect to the combined duration of all currently-captured video clips. For example, the initial timeline length for the timeline progress bar 514 may be preset to a first time threshold (e.g., 10 seconds) such that the timeline progress bar 514 is depicted to fill up upon reaching the first time threshold. Once the combined duration of currently-captured video clips reaches the first time threshold, the timeline length is adjusted to a second time threshold (e.g., 30 seconds), with the current progress (e.g., segment(s)) being depicted to collapse relative to the adjusted timeline length. Once the combined duration of currently-captured video clips reaches the second time threshold, the timeline length is adjusted to a third time threshold (e.g., 60 seconds), with the current progress (e.g., segment(s)) being depicted to collapse relative to the adjusted timeline length.

In one or more embodiments, the camera mode system 214 provides for limiting or capping the combined duration for all currently-captured video clips. For example, the camera mode system 214 may set a maximum duration to 60 seconds (e.g., corresponding to the above-mentioned third time threshold). The capture user interface 502 may display a notification if the total recording time reaches the maximum duration, to prevent the recording of subsequent video clips to include in the media content item.

The capture user interface 502 further includes the undo button 516. As noted above, the undo button 516 may be presented while the second camera mode is active (and not while the first camera mode is active). The undo button 516 is selectable to delete the most recent video clip (e.g., corresponding to the last, or right-most, segment of the timeline progress bar 514). In a case where no video clips are in the timeline progress bar 514, the undo button 516 may be replaced with a close button (depicted as an "x" and discussed further below with respect to FIG. 7), which is selectable to exit the second camera mode and revert to the first camera mode.

Reverting from the second camera mode to the first camera mode may also be effected by user selection of the camera mode selection button 510. In response to user selection of the camera mode selection button 510 while in the second camera mode, the messaging client 104 may prompt the user to confirm that any captured video clips will be removed.

The capture user interface 502 further includes the preview button 518. The preview button 518 is selectable to switch from the capture user interface 502 to the preview user interface 504. On the other hand, the first camera mode in example embodiments may not include the preview button 518 and may instead automatically present a preview interface following capture of the single video clip (or picture).

In the second camera mode, the preview user interface 504 provides for previewing the captured video clips (e.g., clips 16) as captured. In addition, the preview user interface 504 provides user-selectable elements for generating the media content item based on the captured video clips.

In one or more embodiments, the preview user interface 504 includes a user-selectable button (a "±" button, which is depicted and discussed further below with respect to FIG. 7) for adding video clips to the captured video clips. Selection of this button may cause the camera mode system 214 to switch from the preview user interface 504 back to the capture user interface 502, with all video clips and edits being preserved.

For example, the camera mode system 214 may facilitate preserving the clips in local memory in association with the collection management system 204, and may facilitate preserving the edits in local memory in association with the augmentation system 208. In addition to preserving video clips and/or edits with respect to the user-selectable button (the "+" button), the camera mode system 214 may preserve and re-present the video clips and/or edits with respect to the user switching between other interfaces and/or applications. For example, video clips and/or edits are preserved when returning to the camera selection button 506 or preview user interface 504 from one or more of: another interface within the messaging client 104 (e.g., a chat interface, a reply interface); an application other than the messaging client 104 (e.g., with the selected camera mode and/or timeline progress also being preserved as facilitated by camera mode system 214); and/or killing of the messaging client 104 (e.g., with the selected camera mode and/or timeline progress also being preserved).

Referring back to FIG. 5, the preview user interface 504 includes editing tools 526 for modifying/annotating (e.g., drawing on, adding text to, adding stickers to, cropping, and the like) the captured video clips. While not shown in FIG. 5, the preview user interface 504 may further include interface elements (e.g., buttons) for one or more of: saving the captured video clips (e.g., with modifications/annotations) as a media content item; creating or updating a Story based on the captured video clips (e.g., with modifications/ annotations); modifying audio signal(s) associated with the captured video clips; sending a media content item which includes the captured video clips (e.g., with modifications/ annotations) to a contact/friend; and/or broadcasting the media content item in association with a feed interface (e.g., for viewing by other users who are not necessarily contacts/ friends).

As noted, the preview user interface 504 provides for a media content item to be generated based on the multiple video clips. In one or more embodiments, the messaging client 104 (e.g., in conjunction with the messaging server system 108) is configured to combine the multiple video clips, together with modifications or annotations, to generate the media content item based on the combined video clips. The media content item may correspond to a single entity (e.g., video, message) which includes all of the clips (with modifications/annotations). In one or more embodiments, the media content item is configured to be played (e.g., with respect to a viewing user) continuously, so as to loop back to the first video clip after the last video clip is played.

Figure 6B:
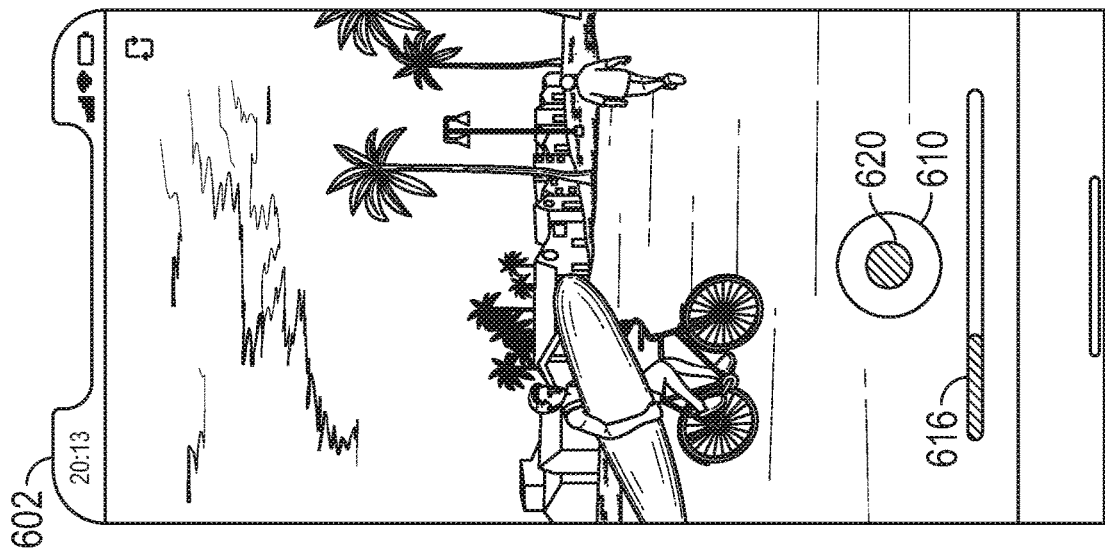
FIGS. 6A-6E illustrate a user interface configured to capture multiple video clips for including into a media content item, in accordance with some example embodiments.
Figure 6A:
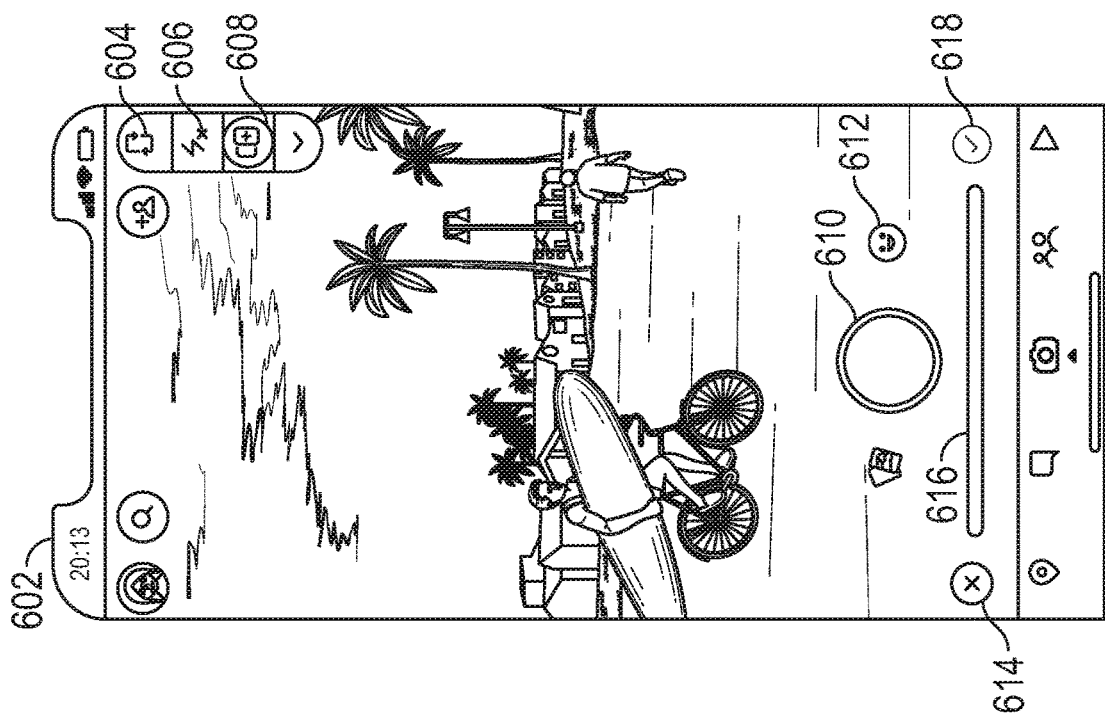
Figure 6D:
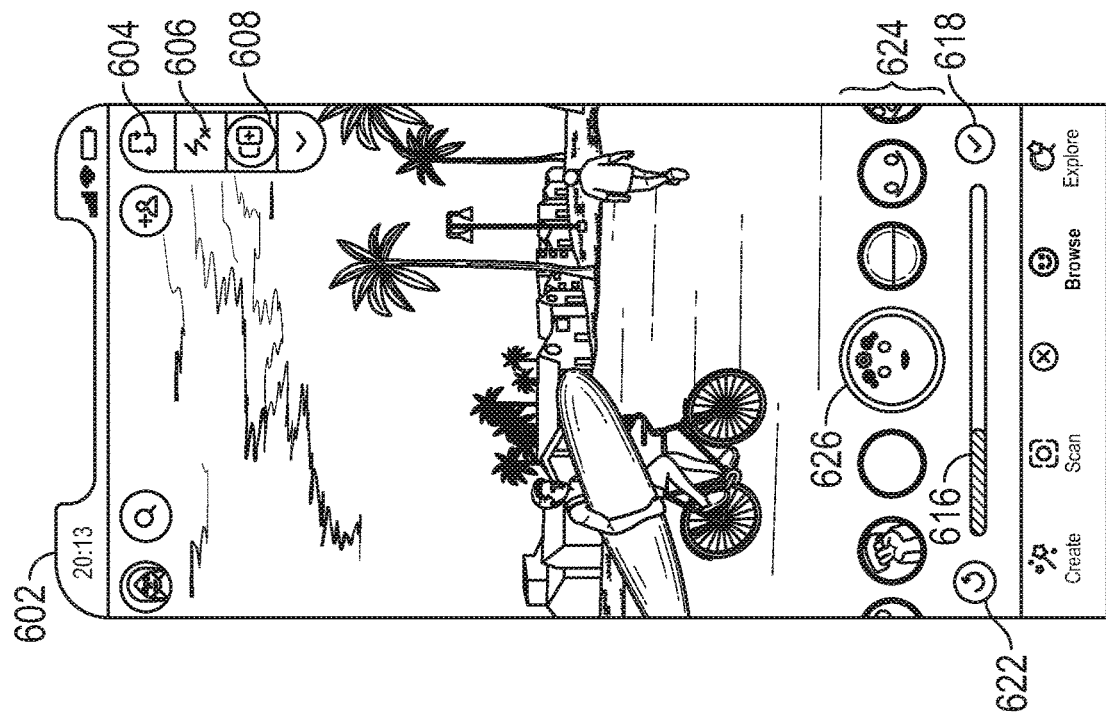
Figure 6C:
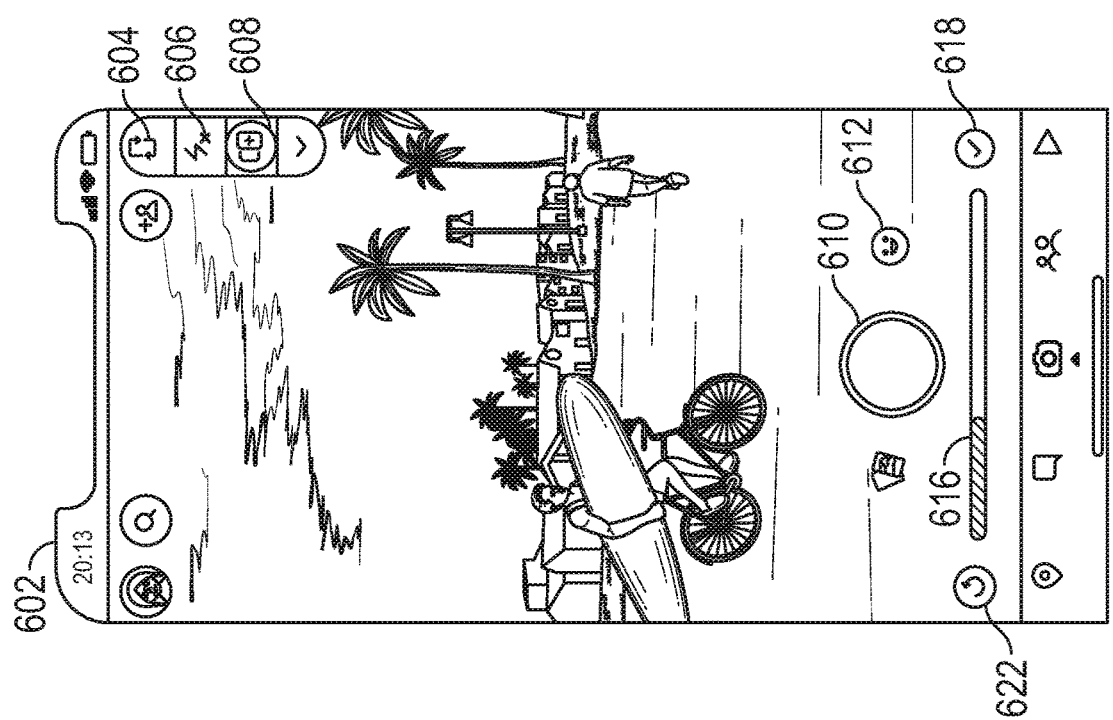
Figure 6E:
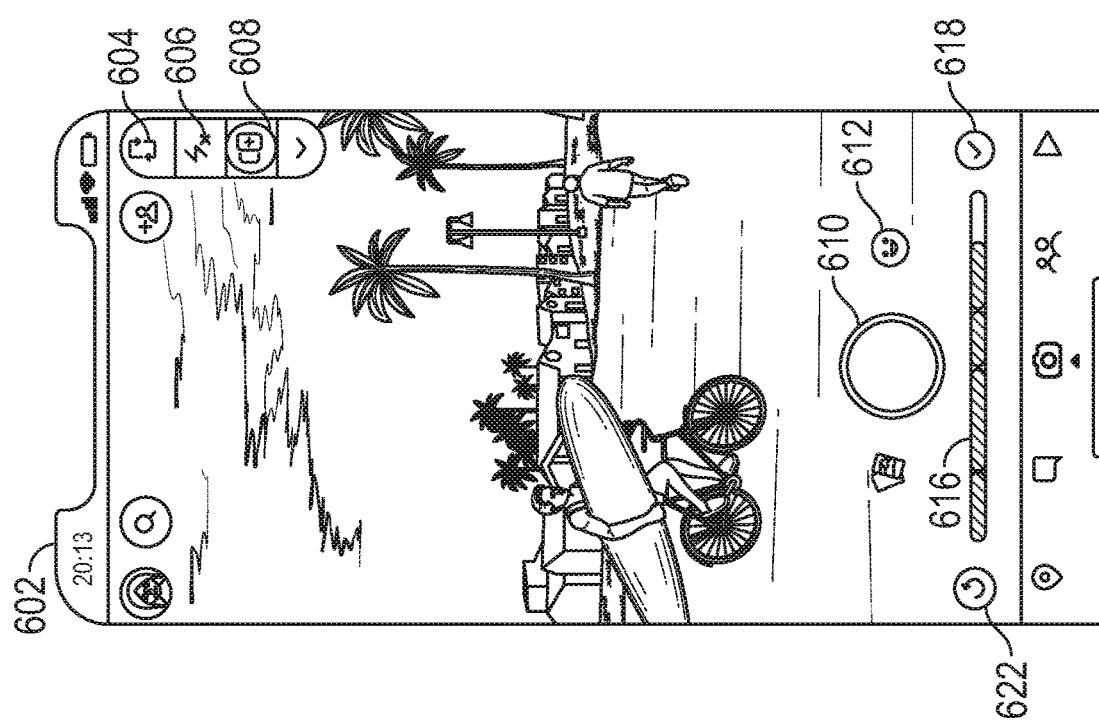

FIGS. 6A-6E illustrate a user interface (e.g., a capture user interface 602) configured to capture multiple video clips for including into a media content item, in accordance with some example embodiments. FIGS. 6A-6E depict example scenarios in which the user selects the above-mentioned second camera mode (FIG. 6A), captures a first video clip (FIGS. 6B-6C), launches a carousel interface (e.g., FIG. 6D), and continues to capture video clips (FIG. 6E).

Similar to the capture user interface 502 of FIG. 5, the capture user interface 602 of FIGS. 6A-6E includes one or more of: a camera selection button 604 (e.g., for switching between rear-facing and front-facing cameras), a flash button 606 (e.g., for activating and deactivating flash), a camera mode selection button 608 (e.g., for switching between the first and second camera modes), a capture button 610, a carousel launch button 612 (e.g., for launching the carousel interface 624), a timeline progress bar 616 (e.g., for displaying progress in capturing video clips), a close button 614 (e.g., for switching from the second camera mode back to the first camera mode), a preview button 618 (e.g., for previewing, editing and generating a media content item based on captured video clip(s)), and/or an undo button 622 (e.g., to delete the most recent video clip).

In the example of FIG. 6A, the user selects the camera mode selection button 608. In one or more embodiments, the capture user interface 602 may default to the first camera mode for capturing a single video clip. In response to selection of the camera mode selection button 608, the messaging client 104 in conjunction with the camera mode system 214 provides for switching from the first camera mode to the second camera mode. As noted above, such switching may include adjusting the capture button 520 to be responsive to different types of touch input for capturing video, and/or adding the undo button 516, the timeline progress bar 514 and the preview button 518 to the capture user interface 502.

The close button 614 is a user-selectable button for closing out of the second camera mode. In response to user selection of the close button 614, the camera mode system 214 provides for exiting the second camera mode and reverting to the first camera mode. In one or more embodiments, the close button 614 is presented when there are no captured video clips (e.g., no video clips have been captured, or all captured video clip(s) have been removed via the undo button 516).

The capture user interface 602 also includes a preview button 618, which is selectable to preview, edit and/or generate a media content item which includes the captured video clip(s). In one or more embodiments, the preview button 618 is enabled after a first video clip has been captured. Alternatively or in addition, the camera mode system 214 may implement a minimum video duration (e.g., 5 seconds) in order to enable the preview button 618. In the example of FIG. 6A, the preview button 618 is disabled since no video clips have yet been captured (e.g., the timeline progress bar 616 is empty). In one or more embodiments, display of the preview button 618 changes when switching from disabled (e.g., a grayed-out checkmark) to enabled (e.g., a yellow checkmark). A tool tip (e.g., a message indicating to "preview your media content item") may direct user attention to the enabled preview button 618. The tool tip may be displayed only once (e.g., a first time), to advise the user that selection of the preview button 618 directs to the preview user interface 504.

FIG. 6B illustrates an example when the user initiates capture of a first video clip. For example, the user initiate capture of the first video clip based on touch input 620 (e.g., a press-and-hold gesture, or a first tap gesture as described above) via the capture button 610. As shown in the example of FIG. 6B, the timeline progress bar 616 is updated in real-time to display a first segment corresponding to the first video clip. The length of the first segment may appear to increase in real-time as each respective video clip is being captured.

FIG. 6C illustrates when the user completes capture of the first video clip (e.g., release of the press-and-hold gesture, or a second tap gesture as described above). In one or more embodiments, upon completion of capturing the first video clip, the camera mode system 214 provides for updating the capture user interface 602 by replacing the close button 614 with the undo button 622 (e.g., which is selectable to remove the first video clip from the timeline progress bar 616), and/or by enabling the preview button 618.

As noted above, the carousel launch button 612 is user-selectable to launch the carousel interface 624. In response to selection of the preview button 618, the capture user interface 602 is updated (e.g., by the camera mode system 214) to display the carousel interface 624 as shown in FIG. 6D. In one or more embodiments, the carousel interface 624 allows the user to cycle through and/or select different augmented reality content items (e.g., Lenses) to apply/ display with respect to images currently being captured by the device camera and being displayed on the device screen. Each of the available augmented reality content items is represented by an icon which is user-selectable for switching to the respective augmented reality content item.

In one or more embodiments, the icon corresponding to an active augmented reality content item (e.g., active AR icon 626) is displayed in a different manner relative to (e.g., larger than) the remaining icons. Behavior of the active AR icon 626 in the second camera mode is similar to that of the capture button 610. For example, the user may select the active AR icon 626 to capture a subsequent video clip(s) via respective press-and-hold gestures and/or first and second tap gestures. The corresponding augmented reality content item (e.g., Lens) is applied to the subsequently-captured video clip(s). In addition, the user may select to apply different augmented reality content items to different video clips as they are captured. In one or more embodiments, a viewing user of the media content item, which includes augmented reality content, may be presented with an interface to apply (e.g., unlock) corresponding augmented reality content item(s) for modifying captured image/video from their end.

In the example of FIG. 6E, the user has captured four video clips, as depicted by respective segments in the timeline progress bar 616. As noted above, the undo button 622 is selectable to remove video clip(s) from the timeline progress bar 616 (e.g., with each tap gesture for removing the most recent video clip). The capture user interface 602 further includes a preview button 618, which is selectable to preview, edit and/or generate a media content item based on the captured video clips via a preview user interface 702 as discussed below with respect to FIG. 7.

Figure 7:
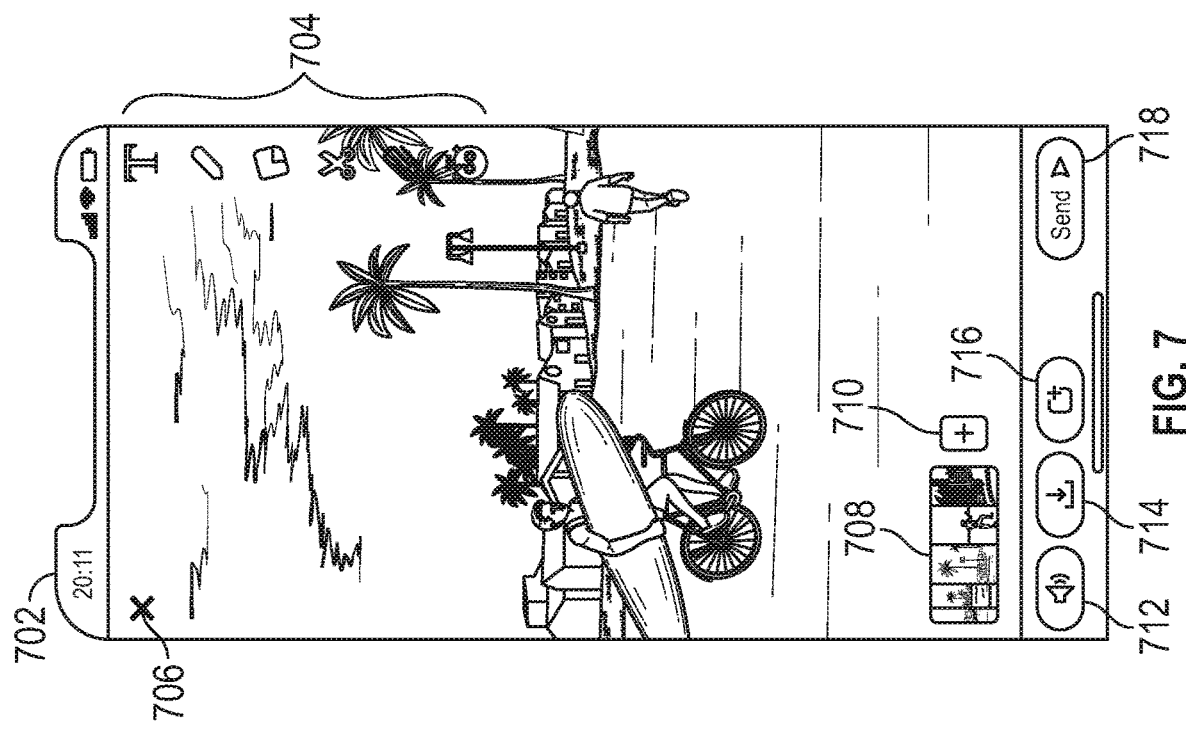
FIG. 7 illustrates a user interface for previewing multiple video clips for combining into a media content item, in accordance with some example embodiments.

FIG. 7 illustrates the preview user interface 702 for previewing multiple video clips for combining into a media content item, in accordance with some example embodiments. For example, FIG. 7 depicts an example scenario in which the user selects to preview the multiple video clips (e.g., 4 video clips) captured in association with FIG. 6D.

Similar to the preview user interface 504 of FIG. 5, the preview user interface 702 of FIG. 7 includes editing tools 704. For example, the editing tools 704 include user-selectable icons (e.g., buttons) for modifying/annotating (e.g., drawing on, adding text to, adding stickers to, cropping, and the like) the captured video clips. The user-selectable icons may include an option for selecting between looping, bouncing (e.g., switching between forward and reverse playback) and/or single playback with respect to the resulting media content item.

In addition, the preview user interface 702 includes: a save button 714 which is selectable to save the captured video clips (e.g., with modifications/annotations) as a media content item; a story button 716 which is selectable to create a Story based on the captured video clips (e.g., with modifications/annotations); an audio button 712 which is selectable to modify audio signal(s) associated with the captured video clips; and/or a send button 718 which is selectable to send a media content item which combines the captured video clips (e.g., including any modifications/annotations) to a recipient (e.g., a contact/friend) and/or to broadcast the media content item to other users of the messaging system 100.

Moreover, the preview user interface 702 provides for looping playback (e.g., for preview purposes) of the captured video clip(s), as shown by looped playback 722. The preview user interface 702 further includes a video preview 708 in which each video clip is represented as a respective thumbnail and in which a position indicator 720 indicates a current playback position for the looped playback 722. The thumbnails are depicted as combined together (e.g., as a combined video clip). In one or more embodiments, the thumbnails are individually selectable for editing/deleting (e.g., in conjunction with one or more of the editing tools 704).

In addition, the preview user interface 702 includes an add video button 710 for adding video clips to the captured video clips (e.g., which are viewable via the video preview 708). In response to user selection of the add video button 710 (e.g., or alternatively, a predefined gesture such as a swipe down gesture within a predefined region of the preview user interface 702), the camera mode system 214 provides for switching from the preview user interface 702 back to the capture user interface 502, with all video clips and edits being preserved. A tool tip (e.g., a message indicating to "go back to camera to add more") may direct user attention to the add video button 710. The tool tip may be displayed only once (e.g., a first time), to advise the user that selection of the add video button 710 directs to the capture user interface 502.

With respect to preserving video clips and edits, the camera mode system 214 may facilitate preserving the clips in local memory in association with the collection management system 204, and may facilitate preserving the edits (e.g., via the editing tools 704) in local memory in association with the augmentation system 208. In one or more embodiments, the preview user interface 702 further includes a close button 706 which is selectable to exit the preview user interface 702 and return to the capture user interface 502 without video clips and/or edits being preserved. In one or more embodiments, user selection of the close button 706 may prompt the user to confirm deletion of the video clips and/or edits.

FIGS. 8A-8C illustrate switching between a carousel interface 816 (included within a capture user interface 802) and an explorer interface 804 for selecting augmented reality content items in association with multi-video clip capture, in accordance with some example embodiments. FIGS. 8A-8C depict example scenarios in which: a user is presented with a carousel interface 816 and selects an explore tab 826 to switch to an explorer interface 804 for browsing available augmented reality content items (e.g., FIG. 8A), the user selects an augmented reality content item via the explorer interface 804 (FIG. 8B), and the user is presented with an updated carousel interface 816 which is configured to persistently include the selected augmented reality content item (e.g., FIG. 8C).

Similar to the capture user interface 602 of FIG. 6D, the capture user interface 802 of FIGS. 8A-8C includes one or more of the following interface elements: a camera selection button 806 (e.g., for switching between rear-facing and front-facing cameras); a flash button 808 (e.g., for activating and deactivating flash); a camera mode selection button 810 (e.g., for switching between the first and second camera modes); captured image data 812 (e.g., corresponding to real-time video/images captured by the device camera); a carousel interface 816 (e.g., for cycling through and/or selecting different augmented reality content items, with the active AR icon 814 corresponding to a currently-selected augmented reality content item); a timeline progress bar 820 (e.g., for displaying progress in capturing video clips); an undo button 818 (e.g., for deleting the most recent video clip); and/or a preview button 822 (e.g., for previewing, editing and generating a media content item based on captured video clip(s)). These interface elements in the capture user interface 802 of FIGS. 8A-8C are configured to perform functions similar to those described above with respect to the capture user interface 602 of FIG. 6D.

As shown in FIG. 8A, the camera mode selection button 810 is highlighted, thereby indicating that the second camera mode is enabled for capturing multiple video clips. In the example of FIG. 8A, one video clip has been captured, for example, as depicted by the timeline progress bar 820 including a single segment. The preview button 822 is enabled (e.g., not grayed out).

Similar to FIG. 6D as described above, the carousel interface 816 of FIG. 8A allows the user to cycle through and/or select different augmented reality content items (e.g., Lenses) to apply/display with respect to the captured image data 812. Each augmented reality content items in the carousel interface 816 is represented by an icon which is user-selectable for switching to the respective augmented reality content item.

The active AR icon 814 is displayed in a different manner relative to (e.g., larger than) the remaining icons. In the example of FIG. 8A, the active AR icon 814 is blank, indicating that an augmented reality content item has not been selected (e.g., corresponding to no AR being applied to the captured image data 812). The user may select the active AR icon 626 to capture additional video clip(s) via respective press-and-hold gestures and/or first and second tap gestures. In addition, the user may select to apply different augmented reality content items to different video clips as they are captured (e.g., such that the generated media content item includes different augmented reality content for different video clips).

In one or more embodiments, the augmented reality content items presented within the carousel interface 816 correspond to a first set of available augmented reality content items. For example, the messaging client 104 in conjunction with the augmentation system 208 is configured to determine the first set of augmented reality content items based on one or more of: a geolocation of the device (e.g., where the augmented reality content items relate to the geolocation); an object detected in the captured image data 812 (e.g., where the augmented reality content items relate to the detected object, such as a face or scenery); a rear-facing or front-facing camera status of the device (e.g., where the augmented reality content items are associated with front or rear capture); user history associated with augmented reality content items (e.g., previously-selected augmented reality content items); and/or user preferences associated with augmented reality content items (e.g., user-specified augmented reality content items such as favorites). An indication of the first set of augmented reality content items may be stored by and accessible via the augmentation system 208.

In one or more embodiments, the carousel interface 816 is presented in association with selection of a browse tab 824 included within the capture user interface 802. In the example of FIG. 8A, the browse tab 824 is selected and as such, the carousel interface 816 is presented for browsing through the first set of augmented reality content items.

The messaging client 104 also provides for browsing a second set of augmented reality content items. In this regard, the capture user interface 802 includes an explore tab 826 which is user-selectable to display the explorer interface 804 shown in FIG. 8B. As shown in FIG. 8B, the explorer interface 804 includes a tiled interface 830 corresponding to the second set of augmented reality content items. In one or more embodiments, the messaging client 104 in conjunction with the augmentation system 208 is configured to determine the second set of augmented reality content items. The second set of augmented reality content items may correspond to augmented reality content items created by users of the messaging system 100.

For example, a user (creator) may design and submit augmented reality content item(s) for use by others within the messaging system 100. The submitted augmented reality content item(s) may be subject to an approval process (e.g., including administrator approval) in order to be included within the second set of augmented reality content items. An indication of the second set of augmented reality content items may be stored by and accessible via the augmentation system 208.

In one or more embodiments, the messaging client 104 in conjunction with the augmentation system 208 facilitates populating the tiled interface 830 with the second set of augmented reality content items. Each augmented reality content item within in the second set is represented as a respective tile. Each tile includes a sample photo (or sample gif) of the corresponding augmented reality content, an icon representing the augmented reality content item (e.g., as discussed above with respect to the carousel interface 816), and a name of the augmented reality content item. The tiled interface 830 provides for scrolling (e.g., vertically scrolling) through the augmented reality content items of the second set in response to a predefined gesture (e.g., a swipe or drag gesture).

The user may select a particular augmented reality content item presented within the tiled interface 830 via a predefined gesture (e.g., by tapping the corresponding augmented reality content item). In the example of FIG. 8B, the user selects the AR content item 832 which is represented by the AR icon 834.

In one or more embodiments, the augmented reality content items within the second set may be grouped via AR tabs 828. In the example of FIG. 8B, the AR tabs 828 include a For You tab (e.g., which may be based at least in part on user history and/or preference), a Trending tab (e.g., based on popularity among users), a Holidays tab (e.g., for relevant holidays and/or seasons), a Face tab (e.g., with face-based effects), a World tab (e.g., for scenic effects) and a Music tab (e.g., for music-related augmented reality content items).

Moreover, the augmented reality content items within the second set may be searched for and/or filtered via the search interface 836. For example, the search interface 836 is configured to receive text-based search input based on one or more of the name, types of detected objects, type of content, and the like. The augmented reality content items may be searchable by one or more of these terms, for example, based on metadata associated with the augmented reality content items. In response to text-based search input entered within the search interface 836 (e.g., including partial and/or complete search terms), the messaging client 104 provides for the tiled interface 830 to present augmented reality content items that match the entered text.

Thus, the messaging client 104 provides for a user to browse through different sets of augmented reality content items. In particular, the browse tab 824 within the capture user interface 802 is selectable to browse the first of augmented reality content items via the carousel interface 816. In addition, the explore tab 826 within the capture user interface 802 is selectable to surface the explorer interface 804 for browsing and/or searching the second set of augmented reality content items.

In response to user selection of the AR content item 832 within the tiled interface 830, the messaging client 104 switches from the explorer interface 804 back to the capture user interface 802 as shown in FIG. 8C. In switching, the messaging client 104 in conjunction with the augmentation system 208 may provide for unlocking the AR content item 832, for example, by activating the AR content item 832 within the capture user interface 802. As shown in the example of FIG. 8C, the captured image data 812 is modified (e.g., in real-time) to include augmented reality content (e.g., effect) corresponding to the AR content item 832. In addition, the carousel interface 816 is updated to indicate the that the AR icon 834 is the active AR icon 814.

In addition, the messaging client 104 in conjunction with the augmentation system 208 provides for updating the first set of augmented reality content items to include the AR content item 832 in a persistent manner. The carousel interface 816 may therefore persistently present the corresponding AR icon 834 while the second camera mode is active (e.g., while the camera mode selection button 810 is highlighted) in the capture user interface 802.

In this regard, the messaging client 104 is configured to manage different camera instances with respect to messaging. For example, the messaging client 104 is configured to manage or otherwise maintain a main camera instance, and one or more modular camera instances. As described herein, the main camera instance corresponds with an active session of the capture user interface 802 as presented in FIGS. 8A-8C. The main camera instance may be associated with the active session for capturing video (e.g., upon startup of the messaging client 104).

On the other hand, the messaging client 104 may invoke or otherwise create one or more modular camera instances in association with other user interfaces provided by the messaging client 104. By way of non-limiting example, the messaging client 104 may create a modular camera instance in association with a reply interface. The reply interface may be surfaced when a user responds to a message (e.g., from a friend), a Story, a chat or the like. The reply interface may activate the device camera in order to capture video/pictures to include in a reply. As such, the reply interface may include interface elements (e.g., similar to one or more of the elements 806-822 within the capture user interface 802) for capturing and/or augmenting video. The messaging client 104 is configured to create a modular camera instance with respect to the reply interface.

Thus, the messaging client 104 is configured to maintain separate camera instances, including a main camera instance and one or more modular camera instances with respect to capturing video and/or pictures. By virtue of maintaining such camera instances, it is possible for the messaging client 104 to preserve settings and/or preferences with respect to images captured across different user interfaces of the messaging client 104.

Regarding the second camera mode (e.g., for multi-video clip capture), the messaging client 104 is configured to save an indication of selections and/or input within the explorer interface 804 in association with the main camera instance. In doing so, the selections and/or input persist when switching between the explorer interface 804 and the capture user interface 802. As noted above with respect to FIG. 8C, the AR content item 832 is unlocked (e.g., activated and/or presented) within the capture user interface 802 in response to user selection of the AR content item 832 within the explorer interface 804. In one or more embodiments, the unlocking by the messaging client 104 is performed with respect to the main camera instance, to facilitate saving the indication of selections and/or input within the explorer interface 804.

Thus, one example of persisting selections and/or input between the explorer interface 804 and the capture user interface 802 corresponds to user selection of the AR content item 832 via the explorer interface 804 (e.g., via the tiled interface 830 or the search interface 836). An indication of the AR content item 832 is stored (e.g., in local memory as an update to the first subset of augmented reality content items) and used to populate the carousel interface 816 when switching thereto. In one or more embodiments, the user may switch away from the capture user interface 802 multiple times (e.g., by switching to different user interfaces within the messaging client 104 and/or by switching between the messaging client 104 and other applications). However, the messaging client 104 is configured to persistently present the AR icon 834 within the carousel interface 816 when the user returns to the capture user interface 802.

In one or more embodiments, the messaging client 104 provides for positioning the AR icon 834 in a first position (e.g., immediately to the right of the active AR icons 814) upon subsequently returning to the capture user interface 802. The user may further continue to select additional augmented reality content items via the explorer interface 804 (e.g., via the tiled interface 830 and/or the search interface 836). The messaging client 104 may store respective indications for each augmented reality content item selected via the explorer interface 804, for persistently presenting (e.g., in front of previously unlocked augmented reality content items) within the carousel interface 816.

In one or more embodiments, the messaging client 104 is configured to remove the stored indication of the selected AR content item 832 (e.g., from local memory) upon completion of a session corresponding to the second camera mode. In one or more embodiments, removing the stored indication causes the messaging client 104 to no longer present the selected AR content item 832 within the carousel interface 816.

The session may be determined to be completed when the user opts to disable the second camera mode (e.g., by tapping the camera mode selection button 810 or selecting a close button as described above), and/or when the user selects to send and/or upload the media content item including the captured video from the session (e.g., by selecting a save button, send button, and/or Story button as described above). In a case where the user sends and/or uploads the media content item, the messaging client 104 may in example embodiments delay removal of the stored indication and continue to persist the stored indication for a preset period of time (e.g., 48 hours after selecting to send and/or broadcast). In such instance, the indication may be stored in the database 126 for the preset period of time, and removed thereafter.

In addition to persisting the selected AR content item 832, the messaging client 104 in example embodiments is configured to save an indication of a position (e.g., a most recent position) within the tiled interface 830 and AR tabs 828 of the explorer interface 804. Thus, in a case of subsequently switching back to the explorer interface 804, the most recent position (e.g., the vertical position within the tiled interface 830 and/or the active tab within AR tabs 828) is persisted in conjunction with the main camera instance. The stored indication may be removed upon completion of the session corresponding to the second camera mode, such that the position no longer persists (e.g., the tiled interface 830 starts from a default position) when subsequently navigating to the explorer interface 804.

Further, the messaging client 104 in example embodiments is configured to save an indication of text-based search term(s) input (e.g., most recently input) by the user within the search interface 836 of the explorer interface 804. Thus, in a case of subsequently switching back to the explorer interface 804, the most recently-entered search terms (e.g., together with the active tab within AR tabs 828) may persist within the search interface 836. The stored indication may be removed upon completion of the session corresponding to the second camera modem, such that the search term no longer persists (e.g., the search interface 836 is instead empty) when subsequently navigating to the explorer interface 804.

Thus, the messaging client 104 provides for persisting indications of user selections between the explorer interface 804 and the capture user interface 802. As a result, it is possible for the messaging client 104 to unlock, present and navigate through augmented reality content items in a more persistent manner.

Figure 9:
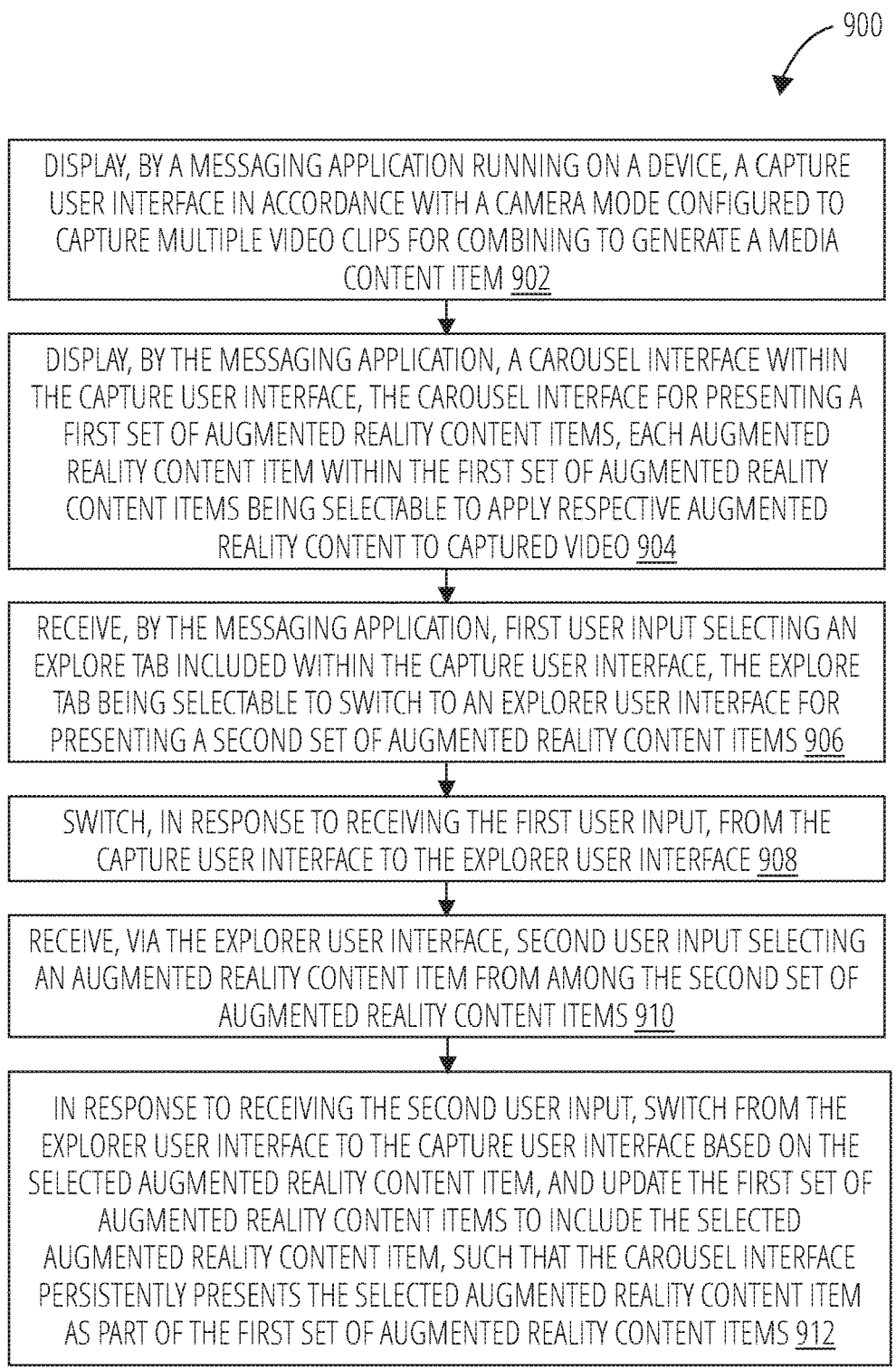
FIG. 9 is a flowchart illustrating a process for presenting available augmented reality content items in association with multi-video clip capture, in accordance with some example embodiments.

FIG. 9 is a flowchart illustrating a process 900 for presenting available augmented reality content items in association with multi-video clip capture, in accordance with some example embodiments. For explanatory purposes, the process 900 is primarily described herein with reference to the messaging client 104 of FIG. 1. However, one or more blocks (or operations) of the process 900 may be performed by one or more other components, and/or by other suitable devices. Further for explanatory purposes, the blocks (or operations) of the process 900 are described herein as occurring in serial, or linearly. However, multiple blocks (or operations) of the process 900 may occur in parallel or concurrently. In addition, the blocks (or operations) of the process 900 need not be performed in the order shown and/or one or more blocks (or operations) of the process 900 need not be performed and/or can be replaced by other operations. The process 900 may be terminated when its operations are completed. In addition, the process 900 may correspond to a method, a procedure, an algorithm, etc.

The messaging client 104 (e.g., in conjunction with the augmentation system 208) displays a capture user interface in accordance with a camera mode configured to capture multiple video clips for combining to generate a media content item (block 902). Display of the capture user interface in accordance with the camera mode may be associated with a main camera instance of the messaging application, the main camera instance being separate from one or more modular camera instances associated other user interfaces of the messaging application.

The messaging client 104 displays a carousel interface within the capture user interface, the carousel interface for presenting a first set of augmented reality content items, each augmented reality content item within the first set of augmented reality content items being selectable to apply respective augmented reality content to captured video (block 904). The first set of augmented reality content items may be based on one or more of a geolocation of the device, an object detected in the captured video, a rear-facing or front-facing camera status of the device, user history associated with augmented reality content items, or user preferences associated with augmented reality content items.

The messaging client 104 receives first user input selecting an explore tab included within the capture user interface, the explore tab being selectable to switch to an explorer user interface for presenting a second set of augmented reality content items (block 906). The second set of augmented reality content items may correspond to augmented reality content items created by users of the messaging application. The carousel interface may be displayed in association with a browse tab included within the capture user interface, such that the browse tab is selectable to browse the first set of augmented reality content items via the carousel interface and the explore tab is selectable to browse or search the second set of augmented reality content items via the explorer user interface.

The messaging client 104 switches, in response to receiving the first user input, from the capture user interface to the explorer user interface (block 908). The messaging client 104 receives, via the explorer user interface, second user input selecting an augmented reality content item from among the second set of augmented reality content items (block 910). The messaging client 104 may unlock, in response to receiving the second user input, the selected augmented reality content item for use with respect to the main camera instance.

The messaging client 104, in response to receiving the second user input, switches from the explorer user interface to the capture user interface based on the selected augmented reality content item, and updates the first set of augmented reality content items to include the selected augmented reality content item, such that the carousel interface persistently presents the selected augmented reality content item as part of the first set of augmented reality content items (block 912). Persistently presenting the selected augmented reality content item as part of the first set of augmented reality content items may include storing an indication of the selected augmented reality content item in association with the main camera instance.

The messaging client 104 may remove the stored indication of the selected augmented reality content item upon completion of a session corresponding to the camera mode. The messaging client 104 may store a position within the explorer user interface in association with the main camera instance, and navigate to the stored position within the explorer user interface in response to subsequent user input selecting the explore tab.

The explorer user interface may include a search interface for text-based searching of the second set of augmented reality content items. Storing the position may further include storing a text-based search term provided within the search interface. Navigating to the stored position may further include pre-populating the search interface with the text-based search term in response to the subsequent user input.

Figure 10:
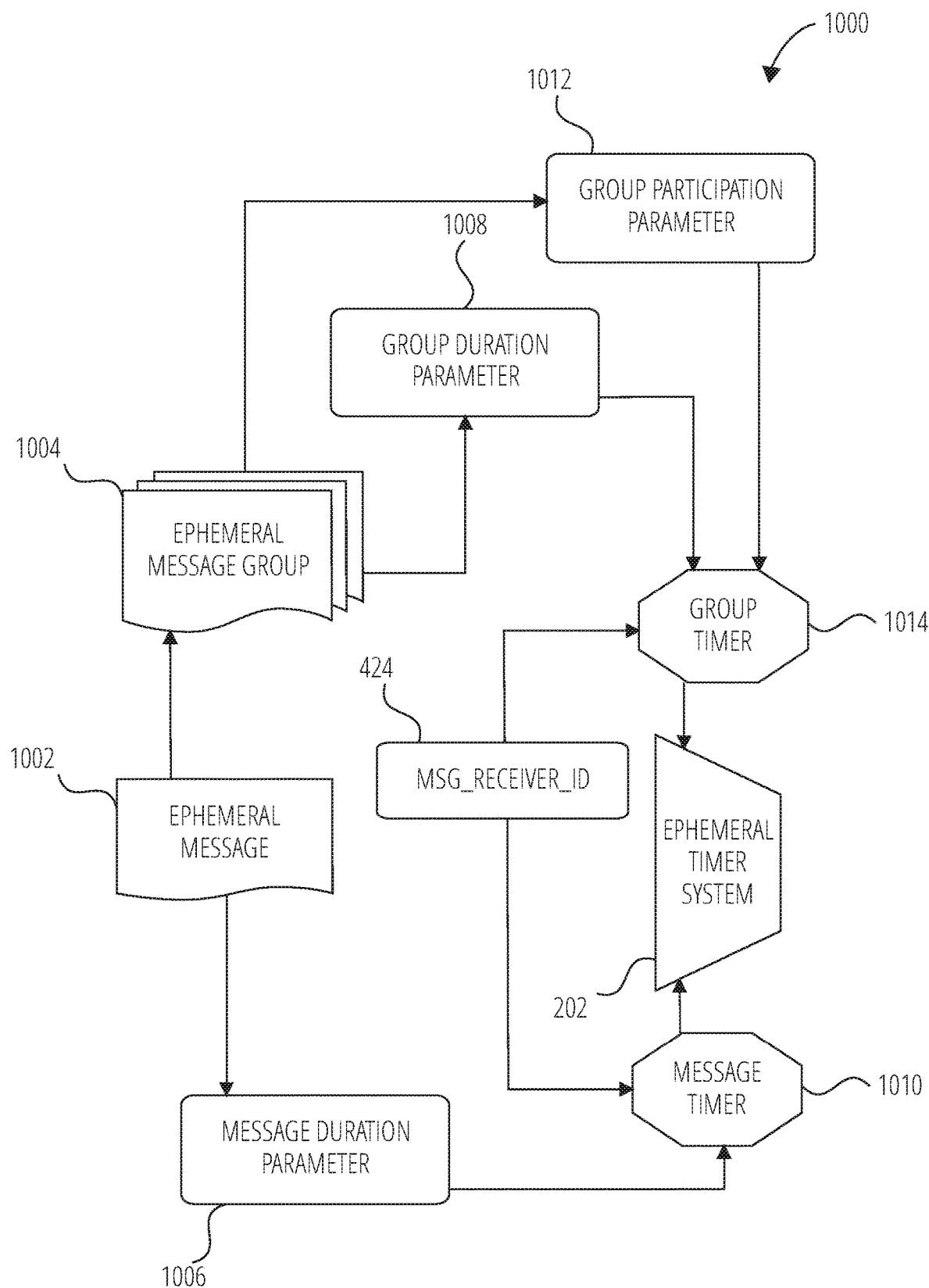
FIG. 10 is a flowchart for an access-limiting process, in accordance with some examples.

FIG. 10 is a schematic diagram illustrating an access-limiting process 1000, in terms of which access to content (e.g., an ephemeral message 1002, and associated multimedia payload of data) or a content collection (e.g., an ephemeral message group 1004) may be time-limited (e.g., made ephemeral).

An ephemeral message 1002 is shown to be associated with a message duration parameter 1006, the value of which determines an amount of time that the ephemeral message 1002 will be displayed to a receiving user of the ephemeral message 1002 by the messaging client 104. In one example, an ephemeral message 1002 is viewable by a receiving user for up to a maximum of 10 seconds, depending on the amount of time that the sending user specifies using the message duration parameter 1006.

The message duration parameter 1006 and the message receiver identifier 424 are shown to be inputs to a message timer 1010, which is responsible for determining the amount of time that the ephemeral message 1002 is shown to a particular receiving user identified by the message receiver identifier 424. In particular, the ephemeral message 1002 will only be shown to the relevant receiving user for a time period determined by the value of the message duration parameter 1006. The message timer 1010 is shown to provide output to a more generalized ephemeral timer system 202, which is responsible for the overall timing of display of content (e.g., an ephemeral message 1002) to a receiving user.

The ephemeral message 1002 is shown in FIG. 10 to be included within an ephemeral message group 1004 (e.g., a collection of messages in a personal story, or an event story). The ephemeral message group 1004 has an associated group duration parameter 1008, a value of which determines a time duration for which the ephemeral message group 1004 is presented and accessible to users of the messaging system 100. The group duration parameter 1008, for example, may be the duration of a music concert, where the ephemeral message group 1004 is a collection of content pertaining to that concert. Alternatively, a user (either the owning user or a curator user) may specify the value for the group duration parameter 1008 when performing the setup and creation of the ephemeral message group 1004.

Additionally, each ephemeral message 1002 within the ephemeral message group 1004 has an associated group participation parameter 1012, a value of which determines the duration of time for which the ephemeral message 1002 will be accessible within the context of the ephemeral message group 1004. Accordingly, a particular ephemeral message group 1004 may "expire" and become inaccessible within the context of the ephemeral message group 1004, prior to the ephemeral message group 1004 itself expiring in terms of the group duration parameter 1008. The group duration parameter 1008, group participation parameter 1012, and message receiver identifier 424 each provide input to a group timer 1014, which operationally determines, firstly, whether a particular ephemeral message 1002 of the ephemeral message group 1004 will be displayed to a particular receiving user and, if so, for how long. Note that the ephemeral message group 1004 is also aware of the identity of the particular receiving user as a result of the message receiver identifier 424.

Accordingly, the group timer 1014 operationally controls the overall lifespan of an associated ephemeral message group 1004, as well as an individual ephemeral message 1002 included in the ephemeral message group 1004. In one example, each and every ephemeral message 1002 within the ephemeral message group 1004 remains viewable and accessible for a time period specified by the group duration parameter 1008. In a further example, a certain ephemeral message 1002 may expire, within the context of ephemeral message group 1004, based on a group participation parameter 1012. Note that a message duration parameter 1006 may still determine the duration of time for which a particular ephemeral message 1002 is displayed to a receiving user, even within the context of the ephemeral message group 1004. Accordingly, the message duration parameter 1006 determines the duration of time that a particular ephemeral message 1002 is displayed to a receiving user, regardless of whether the receiving user is viewing that ephemeral message 1002 inside or outside the context of an ephemeral message group 1004.

The ephemeral timer system 202 may furthermore operationally remove a particular ephemeral message 1002 from the ephemeral message group 1004 based on a determination that it has exceeded an associated group participation parameter 1012. For example, when a sending user has established a group participation parameter 1012 of 24 hours from posting, the ephemeral timer system 202 will remove the relevant ephemeral message 1002 from the ephemeral message group 1004 after the specified 24 hours. The ephemeral timer system 202 also operates to remove an ephemeral message group 1004 when either the group participation parameter 1012 for each and every ephemeral message 1002 within the ephemeral message group 1004 has expired, or when the ephemeral message group 1004 itself has expired in terms of the group duration parameter 1008.

In certain use cases, a creator of a particular ephemeral message group 1004 may specify an indefinite group duration parameter 1008. In this case, the expiration of the group participation parameter 1012 for the last remaining ephemeral message 1002 within the ephemeral message group 1004 will determine when the ephemeral message group 1004 itself expires. In this case, a new ephemeral message 1002, added to the ephemeral message group 1004, with a new group participation parameter 1012, effectively extends the life of an ephemeral message group 1004 to equal the value of the group participation parameter 1012.

Responsive to the ephemeral timer system 202 determining that an ephemeral message group 1004 has expired (e.g., is no longer accessible), the ephemeral timer system 202 communicates with the messaging system 100 (and, for example, specifically the messaging client 104) to cause an indicium (e.g., an icon) associated with the relevant ephemeral message group 1004 to no longer be displayed within a user interface of the messaging client 104. Similarly, when the ephemeral timer system 202 determines that the message duration parameter 1006 for a particular ephemeral message 1002 has expired, the ephemeral timer system 202 causes the messaging client 104 to no longer display an indicium (e.g., an icon or textual identification) associated with the ephemeral message 1002.

Figure 11:
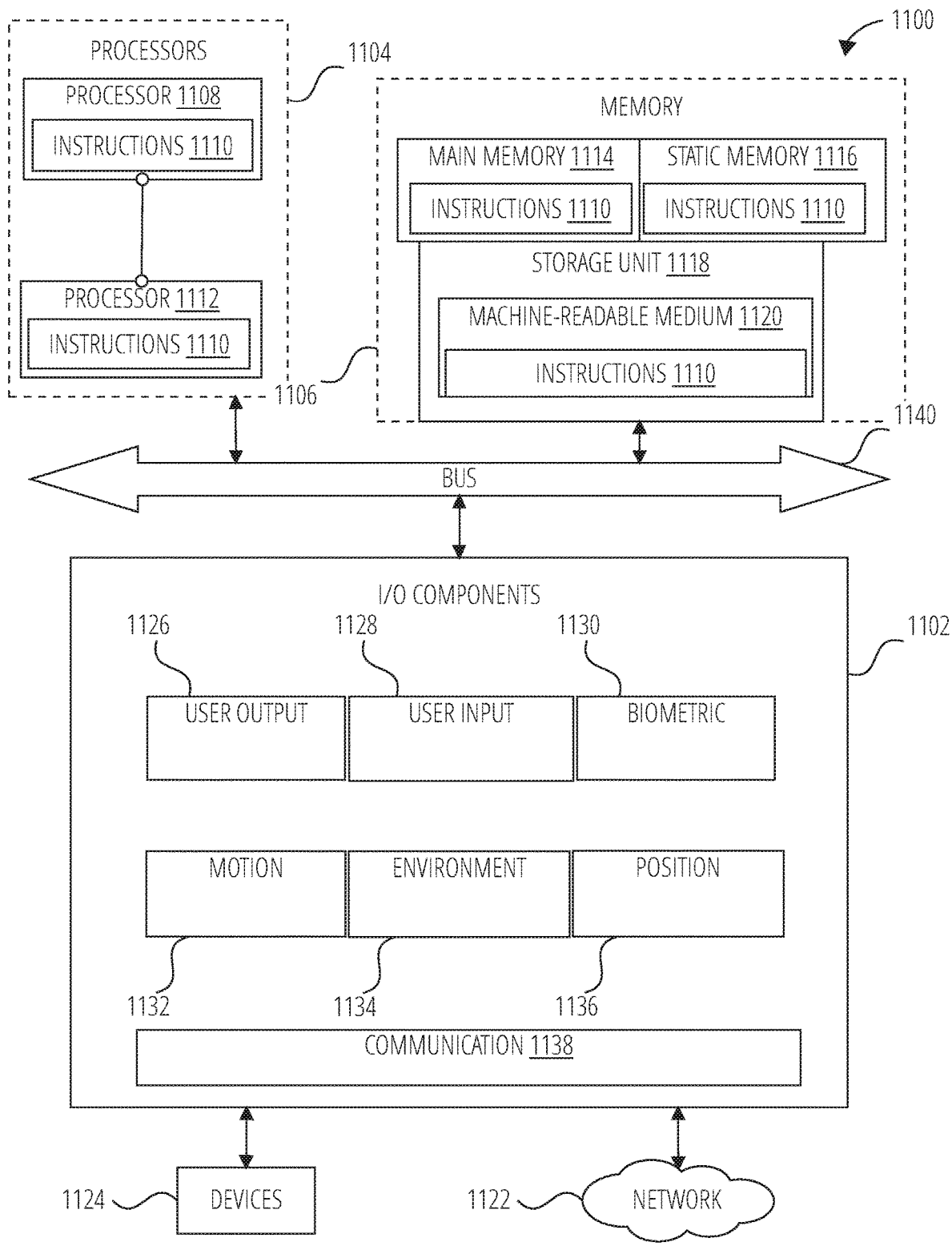
FIG. 11 is a diagrammatic representation of a machine in the form of a computer system within which a set of instructions may be executed for causing the machine to perform any one or more of the methodologies discussed herein, in accordance with some examples.

FIG. 11 is a diagrammatic representation of the machine 1100 within which instructions 1110 (e.g., software, a program, an application, an applet, an app, or other executable code) for causing the machine 1100 to perform any one or more of the methodologies discussed herein may be executed. For example, the instructions 1110 may cause the machine 1100 to execute any one or more of the methods described herein. The instructions 1110 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1110, sequentially or otherwise, that specify actions to be taken by the machine 1100. Further, while only a single machine 1100 is illustrated, the term "machine" shall also be taken to include a collection of machines that individually or jointly execute the instructions 1110 to perform any one or more of the methodologies discussed herein. The machine 1100, for example, may comprise the client device 102 or any one of a number of server devices forming part of the messaging server system 108. In some examples, the machine 1100 may also comprise both client and server systems, with certain operations of a particular method or algorithm being performed on the server-side and with certain operations of the particular method or algorithm being performed on the client-side.

The machine 1100 may include processors 1104, memory 1106, and input/output I/O components 1102, which may be configured to communicate with each other via a bus 1140. In an example, the processors 1104 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1108 and a processor 1112 that execute the instructions 1110. The term "processor" is intended to include multi-core processors that may comprise two or more independent processors (sometimes referred to as "cores") that may execute instructions contemporaneously. Although FIG. 11 shows multiple processors 1104, the machine 1100 may include a single processor with a single-core, a single processor with multiple cores (e.g., a multi-core processor), multiple processors with a single core, multiple processors with multiples cores, or any combination thereof.

The memory 1106 includes a main memory 1114, a static memory 1116, and a storage unit 1118, both accessible to the processors 1104 via the bus 1140. The main memory 1106, the static memory 1116, and storage unit 1118 store the instructions 1110 embodying any one or more of the methodologies or functions described herein. The instructions 1110 may also reside, completely or partially, within the main memory 1114, within the static memory 1116, within machine-readable medium 1120 within the storage unit 1118, within at least one of the processors 1104 (e.g., within the Processor's cache memory), or any suitable combination thereof, during execution thereof by the machine 1100.

The I/O components 1102 may include a wide variety of components to receive input, provide output, produce output, transmit information, exchange information, capture measurements, and so on. The specific I/O components 1102 that are included in a particular machine will depend on the type of machine. For example, portable machines such as mobile phones may include a touch input device or other such input mechanisms, while a headless server machine will likely not include such a touch input device. It will be appreciated that the I/O components 1102 may include many other components that are not shown in FIG. 11. In various examples, the I/O components 1102 may include user output components 1126 and user input components 1128. The user output components 1126 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1128 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1102 may include biometric components 1130, motion components 1132, environmental components 1134, or position components 1136, among a wide array of other components. For example, the biometric components 1130 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1132 include acceleration sensor components (e.g., accelerometer), gravitation sensor components, rotation sensor components (e.g., gyroscope).

The environmental components 1134 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1136 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1102 further include communication components 1138 operable to couple the machine 1100 to a network 1122 or devices 1124 via respective coupling or connections. For example, the communication components 1138 may include a network interface Component or another suitable device to interface with the network 1122. In further examples, the communication components 1138 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1124 may be another machine or any of a wide variety of peripheral devices (e.g., a peripheral device coupled via a USB).

Moreover, the communication components 1138 may detect identifiers or include components operable to detect identifiers. For example, the communication components 1138 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1138, such as location via Internet Protocol (IP) geolocation, location via Wi-Fi® signal triangulation, location via detecting an NFC beacon signal that may indicate a particular location, and so forth.

The various memories (e.g., main memory 1114, static memory 1116, and memory of the processors 1104) and storage unit 1118 may store one or more sets of instructions and data structures (e.g., software) embodying or used by any one or more of the methodologies or functions described herein. These instructions (e.g., the instructions 1110), when executed by processors 1104, cause various operations to implement the disclosed examples.

The instructions 1110 may be transmitted or received over the network 1122, using a transmission medium, via a network interface device (e.g., a network interface component included in the communication components 1138) and using any one of several well-known transfer protocols (e.g., hypertext transfer protocol (HTTP)). Similarly, the instructions 1110 may be transmitted or received using a transmission medium via a coupling (e.g., a peer-to-peer coupling) to the devices 1124.

Figure 12:
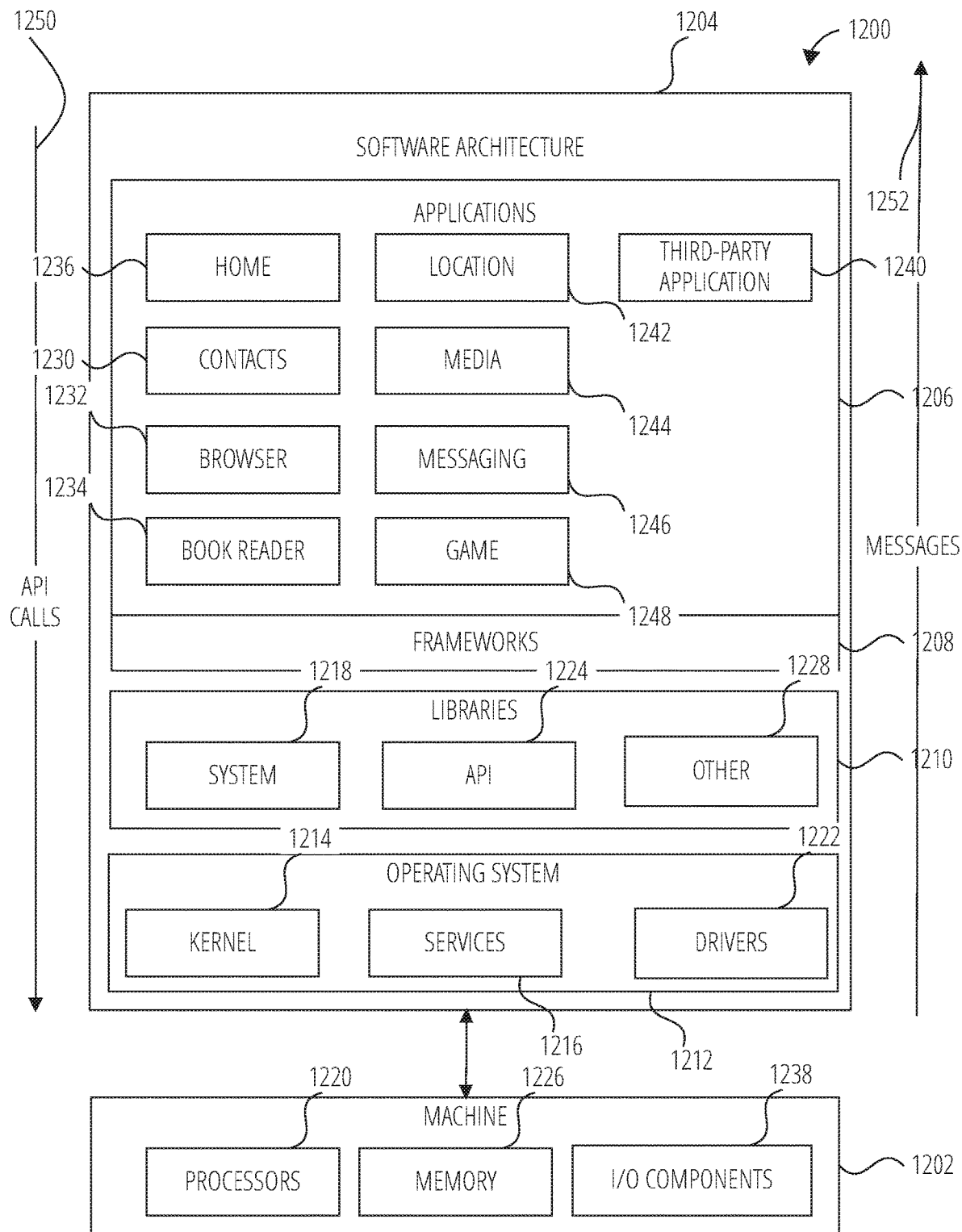
FIG. 12 is a block diagram showing a software architecture within which examples may be implemented.

FIG. 12 is a block diagram 1200 illustrating a software architecture 1204, which can be installed on any one or more of the devices described herein. The software architecture 1204 is supported by hardware such as a machine 1202 that includes processors 1220, memory 1226, and PO components 1238. In this example, the software architecture 1204 can be conceptualized as a stack of layers, where each layer provides a particular functionality. The software architecture 1204 includes layers such as an operating system 1212, libraries 1210, frameworks 1208, and applications 1206. Operationally, the applications 1206 invoke API calls 1250 through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, processor management (e.g., scheduling), component management, networking, and security settings, among other functionality. The services 1216 can provide other common services for the other software layers. The drivers 1222 are responsible for controlling or interfacing with the underlying hardware. For instance, the drivers 1222 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1210 provide a common low-level infrastructure used by the applications 1206. The libraries 1210 can include system libraries 1218 (e.g., C standard library) that provide functions such as memory allocation functions, string manipulation functions, mathematic functions, and the like. In addition, the libraries 1210 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1210 can also include a wide variety of other libraries 1228 to provide many other APIs to the applications 1206.

The frameworks 1208 provide a common high-level infrastructure that is used by the applications 1206. For example, the frameworks 1208 provide various graphical user interface (GUI) functions, high-level resource management, and high-level location services. The frameworks 1208 can provide a broad spectrum of other APIs that can be used by the applications 1206, some of which may be specific to a particular operating system or platform.

In an example, the applications 1206 may include a home application 1236, a contacts application 1230, a browser application 1232, a book reader application 1234, a location application 1242, a media application 1244, a messaging application 1246, a game application 1248, and a broad assortment of other applications such as a third-party application 1240. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In a specific example, the third-party application 1240 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1240 can invoke the API calls 1250 provided by the operating system 1212 to facilitate functionality described herein, Glossary "Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third. Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method, comprising:
   displaying, by a messaging application running on a device, a capture user interface in accordance with a camera mode configured to capture multiple video clips for combining to generate a media content item;
   displaying, by the messaging application, a carousel interface within the capture user interface, the carousel interface for presenting a first set of augmented reality content items, each augmented reality content item within the first set of augmented reality content items being selectable to apply respective augmented reality content to captured video;
   receiving, by the messaging application, first user input selecting an explore tab included within the capture user interface, the explore tab being selectable to switch to an explorer user interface for presenting a second set of augmented reality content items;
   switching, in response to receiving the first user input, from the capture user interface to the explorer user interface;
   receiving, via the explorer user interface, second user input selecting an augmented reality content item from among the second set of augmented reality content items; and
   in response to receiving the second user input,
   switching from the explorer user interface to the capture user interface based on the selected augmented reality content item, and
   updating the first set of augmented reality content items to include the selected augmented reality content item, such that the carousel interface persistently presents the selected augmented reality content item as part of the first set of augmented reality content items,
   wherein display of the capture user interface in accordance with the camera mode is associated with a main camera instance of the messaging application, the main camera instance being separate from one or more modular camera instances associated other user interfaces of the messaging application, at least one of the one or more modular camera instances being associated with a reply interface wherein the capture user interface in accordance with the camera mode is configured to capture the multiple video clips while displaying a timeline progress bar comprising multiple segments, each of the multiple segments being updated within the timeline progress bar as each of the multiple video clips is captured.

2. The method of claim 1, further comprising:
   unlocking, in response to receiving the second user input, the selected augmented reality content item for use with respect to the main camera instance.

3. The method of claim 1, wherein persistently presenting the selected augmented reality content item as part of the first set of augmented reality content items comprises storing an indication of the selected augmented reality content item in association with the main camera instance.

4. The method of claim 3, further comprising:
   removing the stored indication of the selected augmented reality content item upon completion of a session corresponding to the camera mode.

5. The method of claim 1, further comprising:
   storing a position within the explorer user interface in association with the main camera instance; and
   navigating to the stored position within the explorer user interface in response to subsequent user input selecting the explore tab.

6. The method of claim 5, wherein the explorer user interface includes a search interface for text-based searching of the second set of augmented reality content items,
   wherein storing the position further comprises storing a text-based search term provided within the search interface, and wherein navigating to the stored position further comprises pre-populating the search interface with the text-based search term in response to the subsequent user input.

7. The method of claim 1, wherein the carousel interface is displayed in association with a browse tab included within the capture user interface, such that the browse tab is selectable to browse the first set of augmented reality content items via the carousel interface and the explore tab is selectable to browse or search the second set of augmented reality content items via the explorer user interface.

8. The method of claim 1, wherein the first set of augmented reality content items is based on one or more of a geolocation of the device, an object detected in the captured video, a rear-facing or front-facing camera status of the device, user history associated with augmented reality content items, or user preferences associated with augmented reality content items.

9. The method of claim 1, wherein the second set of augmented reality content items corresponds to augmented reality content items created by users of the messaging application.

10. The method of claim 1, wherein the capture user interface in accordance with the camera mode is configured to receive, for each video clip of the multiple video clips, user selection of a different augmented reality content item to apply as the video clip is being captured.

11. A system comprising:
a processor; and
a memory storing instructions that, when executed by the processor, configure the processor to perform operations comprising:
displaying, by a messaging application, a capture user interface in accordance with a camera mode configured to capture multiple video clips for combining to generate a media content item;
displaying, by the messaging application, a carousel interface within the capture user interface, the carousel interface for presenting a first set of augmented reality content items, each augmented reality content item within the first set of augmented reality content items being selectable to apply respective augmented reality content to captured video;
receiving, by the messaging application, first user input selecting an explore tab included within the capture user interface, the explore tab being selectable to switch to an explorer user interface for presenting a second set of augmented reality content items;
switching, in response to receiving the first user input, from the capture user interface to the explorer user interface;
receiving, via the explorer user interface, second user input selecting an augmented reality content item from among the second set of augmented reality content items; and
in response to receiving the second user input,
switching from the explorer user interface to the capture user interface based on the selected augmented reality content item, and
updating the first set of augmented reality content items to include the selected augmented reality content item, such that the carousel interface persistently presents the selected augmented reality content item as part of the first set of augmented reality content items,
wherein display of the capture user interface in accordance with the camera mode is associated with a main camera instance of the messaging application, the main camera instance being separate from one or more modular camera instances associated other user interfaces of the messaging application, at least one of the one or more modular camera instances being associated with a reply interface wherein the capture user interface in accordance with the camera mode is configured to capture the multiple video clips while displaying a timeline progress bar comprising multiple segments, each of the multiple segments being updated within the timeline progress bar as each of the multiple video clips is captured.

12. The system of claim 11, the operations further comprising:
unlocking, in response to receiving the second user input, the selected augmented reality content item for use with respect to the main camera instance.

13. The system of claim 11, wherein persistently presenting the selected augmented reality content item as part of the first set of augmented reality content items comprises storing an indication of the selected augmented reality content item in association with the main camera instance.

14. The system of claim 13, the operations further comprising:
removing the stored indication of the selected augmented reality content item upon completion of a session corresponding to the camera mode.

15. The system of claim 11, the operations further comprising:
storing a position within the explorer user interface in association with the main camera instance; and
navigating to the stored position within the explorer user interface in response to subsequent user input selecting the explore tab.

16. The system of claim 15, wherein the explorer user interface includes a search interface for text-based searching of the second set of augmented reality content items,
wherein storing the position further comprises storing a text-based search term provided within the search interface, and
wherein navigating to the stored position further comprises pre-populating the search interface with the text-based search term in response to the subsequent user input.

17. The system of claim 11, wherein the carousel interface is displayed in association with a browse tab included within the capture user interface, such that the browse tab is selectable to browse the first set of augmented reality content items via the carousel interface and the explore tab is selectable to browse or search the second set of augmented reality content items via the explorer user interface.

18. The system of claim 11, wherein the first set of augmented reality content items is based on one or more of a device geolocation, an object detected in the captured video, a rear-facing or front-facing camera status, user history associated with augmented reality content items, or user preferences associated with augmented reality content items.

19. A non-transitory computer-readable storage medium, the computer-readable storage medium including instructions that when executed by a computer, cause the computer to perform operations comprising:
displaying, by a messaging application, a capture user interface in accordance with a camera mode configured to capture multiple video clips for combining to generate a media content item;
displaying, by the messaging application, a carousel interface within the capture user interface, the carousel interface for presenting a first set of augmented reality content items, each augmented reality content item within the first set of augmented reality content items being selectable to apply respective augmented reality content to captured video;

receiving, by the messaging application, first user input selecting an explore tab included within the capture user interface, the explore tab being selectable to switch to an explorer user interface for presenting a second set of augmented reality content items;

switching, in response to receiving the first user input, from the capture user interface to the explorer user interface;

receiving, via the explorer user interface, second user input selecting an augmented reality content item from among the second set of augmented reality content items; and in response to receiving the second user input, switching from the explorer user interface to the capture user interface based on the selected augmented reality content item, and updating the first set of augmented reality content items to include the selected augmented reality content item, such that the carousel interface persistently presents the selected augmented reality content item as part of the first set of augmented reality content items, wherein display of the capture user interface in accordance with the camera mode is associated with a main camera instance of the messaging application, the main camera instance being separate from one or more modular camera instances associated other user interfaces of the messaging application, at least one of the one or more modular camera instances being associated with a reply interface wherein the capture user interface in accordance with the camera mode is configured to capture the multiple video clips while displaying a timeline progress bar comprising multiple segments, each of the multiple segments being updated within the timeline progress bar as each of the multiple video clips is captured.

\* \* \* \* \*